(12) United States Patent
Tamaki et al.

(10) Patent No.: US 10,940,775 B2
(45) Date of Patent: Mar. 9, 2021

(54) SEAT SLIDE DEVICE

(71) Applicant: TF-METAL CO., LTD., Kosai (JP)

(72) Inventors: Kazuki Tamaki, Kosai (JP); Hirotsugu Kuroda, Kosai (JP); Fumisato Mase, Kosai (JP); Shunsuke Kuroda, Kosai (JP)

(73) Assignee: TF-METAL CO., LTD., Kosai (JP)

( * ) Notice: Subject to any disclaimer, the term of this patent is extended or adjusted under 35 U.S.C. 154(b) by 21 days.

(21) Appl. No.: 16/287,643

(22) Filed: Feb. 27, 2019

(65) Prior Publication Data

US 2019/0283630 A1 Sep. 19, 2019

(30) Foreign Application Priority Data

Mar. 16, 2018 (JP) .............................. JP2018-049481
Mar. 16, 2018 (JP) .............................. JP2018-049494
Aug. 29, 2018 (JP) .............................. JP2018-160224

(51) Int. Cl.
*B60N 2/00* (2006.01)
*B60N 2/08* (2006.01)
*B60N 2/07* (2006.01)

(52) U.S. Cl.
CPC ........... *B60N 2/085* (2013.01); *B60N 2/0705* (2013.01); *B60N 2/08* (2013.01); *B60N 2/0818* (2013.01);
(Continued)

(58) Field of Classification Search
CPC ........ B60N 2/0715; B60N 2/067; B60N 2/06; B60N 2/929; B60N 2/164; B60N 2/1853
(Continued)

(56) References Cited

U.S. PATENT DOCUMENTS 6,926,443 B2 * 8/2005 Niimi ................... B60N 2/0705
                                                    248/429
9,327,616 B2 * 5/2016 Hoshihara ............ B60N 2/0818
(Continued)

FOREIGN PATENT DOCUMENTS

JP          9-104266 A      4/1997
JP          H10-32959 A     2/1998
(Continued)

OTHER PUBLICATIONS

Search Report dated Aug. 30, 2019 issued in corresponding European Application No. 19159548.7.

*Primary Examiner* — Steven M Marsh
(74) *Attorney, Agent, or Firm* — Nath, Goldberg & Meyer; Jerald L. Meyer

(57) ABSTRACT

A release lever includes: a release pressing portion pressing a portion around a lock portion of a plate spring to release an engagement of the lock portion with a locked portion; an operation portion located in a front side of the release lever and operated by a lock release operation of an operation handle; and a swing fulcrum portion provided between the release pressing portion and the operation portion. The plate spring integrally includes: a base including the swing fulcrum portion and fixed to an upper rail; a rear biasing portion located behind the base in a vehicle front-rear direction and biasing the lock portion in a lock direction; and a front biasing portion located in front of the base in the vehicle front-rear direction and biasing the operation handle upward. The front biasing portion has a biasing force smaller than that of the rear biasing portion.

15 Claims, 33 Drawing Sheets

(52) U.S. Cl.
CPC ......... *B60N 2/0875* (2013.01); *B60N 2/0887* (2013.01)

(58) Field of Classification Search
USPC .............................. 248/424, 429, 503, 503.1
See application file for complete search history.

(56) References Cited

U.S. PATENT DOCUMENTS

| | | | |
|---|---|---|---|
| 2014/0203157 A1* | 7/2014 | Nagura | B60N 2/0725 |
| | | | 248/429 |
| 2015/0069202 A1* | 3/2015 | Hayashi | B60N 2/06 |
| | | | 248/429 |

FOREIGN PATENT DOCUMENTS

| | | |
|---|---|---|
| JP | 10-329594 A | 12/1998 |
| JP | 2011-98610 A | 5/2011 |
| JP | 2011-230715 A | 11/2011 |
| JP | 2012-126184 A | 7/2012 |
| WO | 2018/062076 A1 | 4/2018 |

* cited by examiner

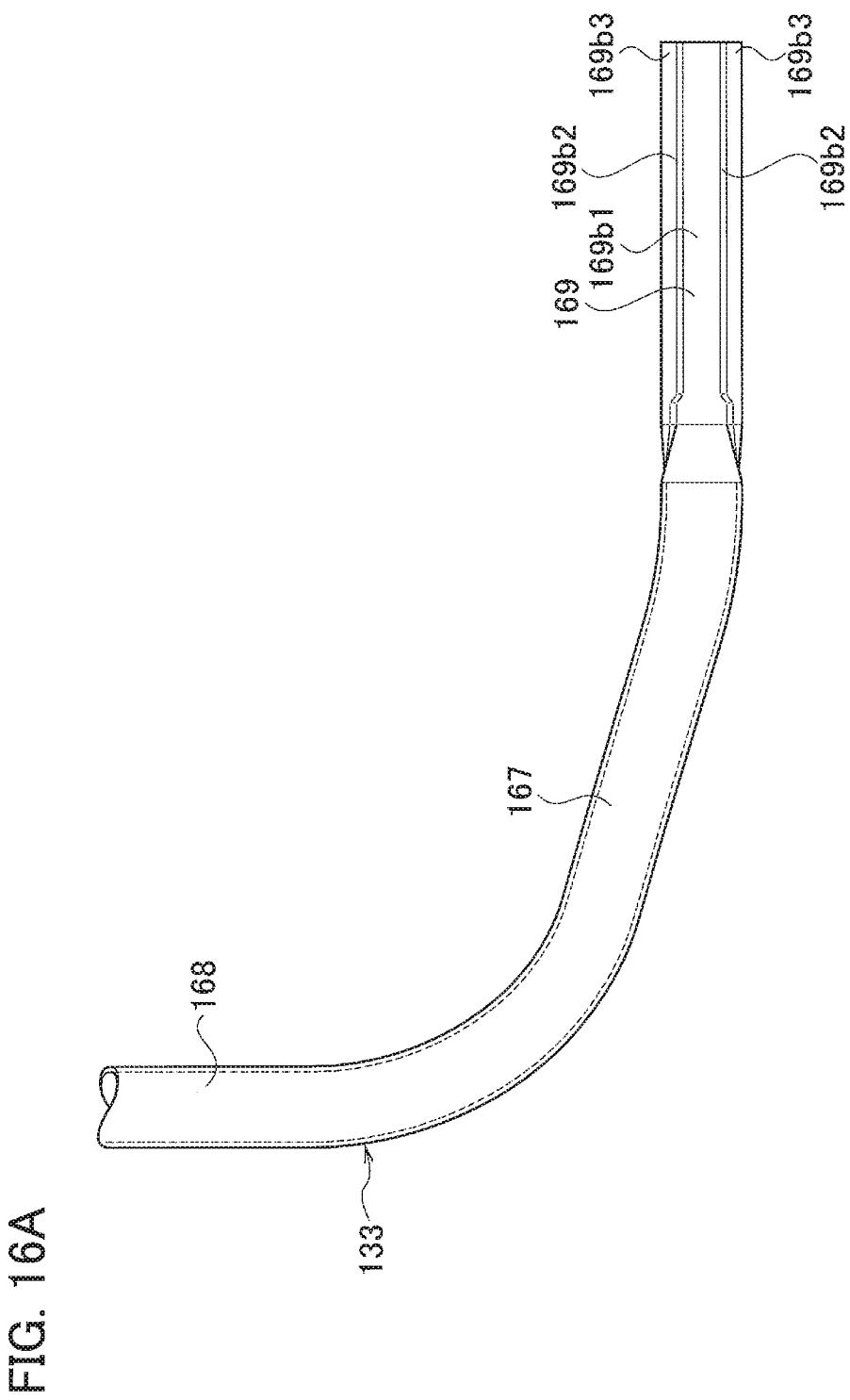

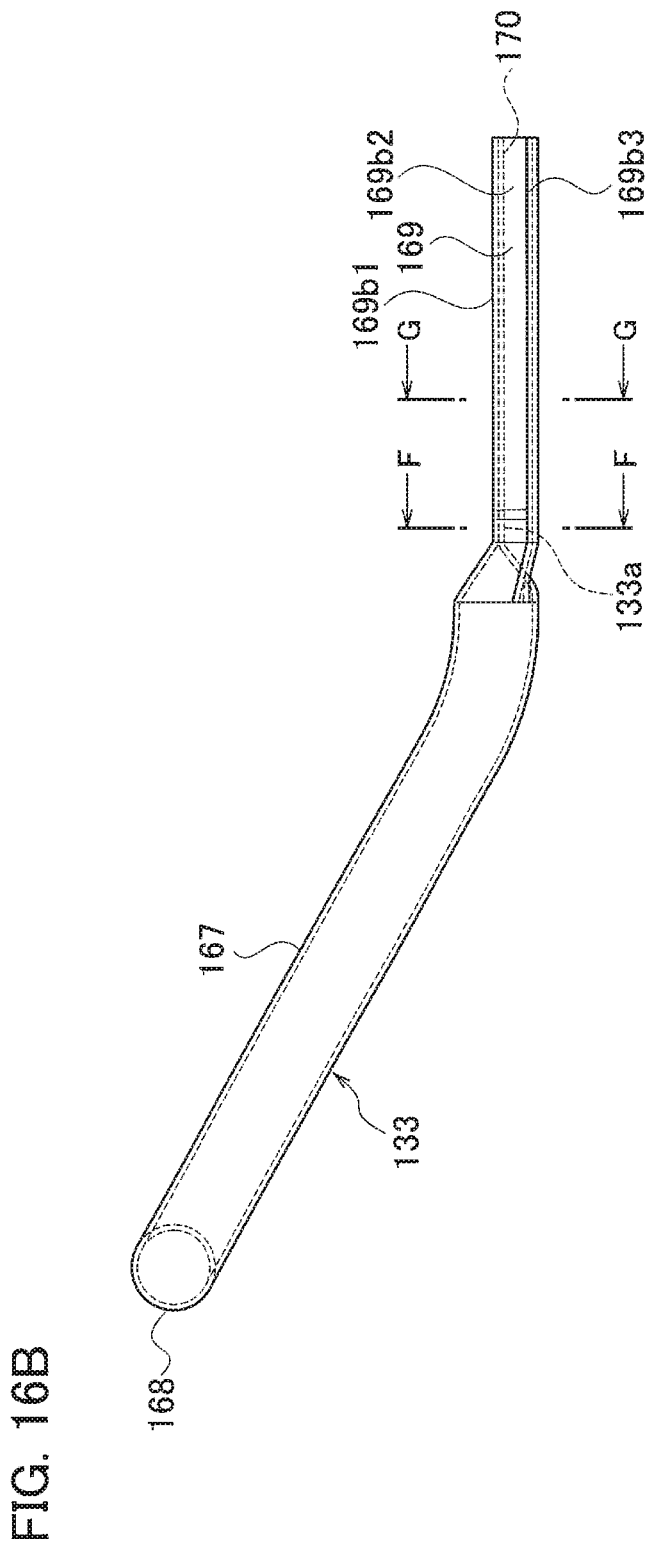

SEAT SLIDE DEVICE

CROSS REFERENCE TO RELATED APPLICATION

This application is based upon and claims the benefit of priority from the prior Japanese Patent Application Nos. 2018-160224 filed on Aug. 29, 2017, 2018-049481 filed on Mar. 16, 2018 and 2018-049494 filed on Mar. 16, 2018, the entire contents of which are incorporated herein by reference.

BACKGROUND

1. Technical Field

The disclosure relates to a seat slide device provided in a vehicle.

2. Related Art

In a seat slide device for a vehicle, an upper rail fixed to a seat is provided to be movable by sliding on a lower rail fixed to a vehicle body, and lock teeth (lock portion) of a lock member attached to the upper rail engage with lock grooves in the lower rail to lock the seat. In a lock member described in Japanese Patent Application Publication No. Hei 9-104266, an opening is provided in a flange bent downward in front of a fixation portion to an upper rail, an operation handle is inserted into this opening from the front side, and is passed through a through hole provided near the center of the lock member such that a distal end of the operation handle is arranged above the lock member. The lock member is formed of an elastic body configured to bias the operation handle in a lock direction. Operating the operation handle upward causes the distal end to move the lock member downward and release the lock. The diameter of a portion of the operation handle inserted into the opening in the flange is reduced and a stopper is provided at the distal end of the operation handle. The operation handle is thereby fixed to the lock member in the front-rear direction.

In the aforementioned seat slide device, the operation handle needs to be inserted deep into a gap space in order to engage the operation handle with the lock member. Since the distal end of the operation handle is passed through the two holes in the lock member in this insertion, the aforementioned seat slide device has very poor assemblability. To counter this problem, unlike in the aforementioned seat slide device in which the operation handle serves also as a release lever, Japanese Patent Application Publication Nos. 2011-230715 and 2012-126184 propose a structure in which an operation handle and a lock release lever are provided separately and are coupled to each other near a front end of a rail.

In a lock member of Japanese Patent Application Publication No. Hei 10-329594, the frontmost lock portion among multiple lock portions provided to be aligned in a vehicle front-rear direction is set to be tightly fitted to a lock groove without a gap in engagement with the lock groove and the other lock portions are set to be loosely fitted to lock grooves in engagement therewith. This eliminates backlash between an upper rail and a lower rail in the vehicle front-rear direction and also stabilizes a position where the lock portions enter the lock grooves and achieves stable lock strength. Japanese Patent Application Publication No. 2011-98610 discloses a lock member in which lock portions are formed in left and right portions.

SUMMARY

In the techniques of Japanese Patent Application Publication Nos. 2011-230715 and 2012-126184, the operation handle is coupled to the end of the lock release lever. Accordingly, a biasing portion to bias the lock member in the lock direction and a biasing portion to bias the operation handle upward need to be separately provided and this leads to an increase in the number of parts.

Moreover, assume a case where the left and right lock portions disclosed in Japanese Patent Application Publication No. 2011-98610 are set to be tightly fitted without gaps as in the frontmost lock portion in Japanese Patent Application Publication No. Hei 10-32959 which is tightly fitted to the lock groove without a gap in engagement with the lock groove. In this case, it is quite difficult to insert the two lock portions into the lock grooves. Accordingly, it is conceivable to employ the setting of fitting without a gap only in one of the left and right lock portions.

When only one of the left and right lock portions is fitted without a gap, the following phenomenon may occur. When the lock member receives impact in the vehicle front-rear direction, twisting deformation about an axis in the vehicle front-rear direction occurs in the lock member while the lock portion fitted without a gap act as a support point, and the lock portions located away from the frontmost lock portion and on the opposite side in the left-right direction to the side where the lock portion fitted without a gap is provided may be brought into contact with the lock grooves. Since there are variations in the dimensions of the lock portions and the lock grooves in manufacturing, this phenomenon may occur in such a way that the contact occurs only in one of the aforementioned multiple lock portions provided on the opposite side in the left-right direction instead of occurring simultaneously in multiple lock portions other than the lock portion fitted without a gap. For example, when the right frontmost lock portion and the left rearmost lock portion come into contact with the lock grooves, the lock member is deformed and tilted in the up-down direction as if to rotate with these two lock portions acting as support points. This may cause the lock member to receive force which moves the lock member in such a direction that it is disengaged from the lower rail.

The disclosure is directed to integrating a biasing portion configured to bias a lock member in a lock direction and a biasing portion configured to bias an operation handle and reducing the number of parts and to also improving assemblability of the parts.

A seat slide device in accordance with some embodiments includes: a lower rail extending in a vehicle front-rear direction and including a locked portion; an upper rail movable relative to the lower rail in a longitudinal direction of the lower rail; a lock member attached to the upper rail and including a lock portion biased in a lock direction in hi h the lock portion engages with the locked portion; a release lever arranged at a position overlapping the lock member in a longitudinal direction of the upper rail; an operation handle extending from a front side of the release lever in the vehicle front-rear direction and configured to operate the release lever in a lock release direction by moving integrally with the release lever with a swing fulcrum portion acting as a fulcrum in response to a lock release operation. The release lever includes: a release pressing portion capable of pressing a portion around the lock portion of the lock member to release an engagement of the lock portion with the locked portion; an operation portion located in the front side of the release lever and configured to be operated by the lock release operation of the operation handle; and the swing fulcrum portion provided between the release pressing portion and the operation portion. The lock member is a plate spring integrally including: a base including the swing fulcrum portion and fixed to the upper rail; a rear biasing portion located behind the base in the vehicle front-rear direction and configured to bias the lock portion in the lock direction; and a front biasing portion located in front of the base in the vehicle front-rear direction and configured to bias the operation handle upward, the front biasing portion having a biasing force smaller than a biasing force of the rear biasing portion.

According to the aforementioned configuration, the lock member is formed of the plate spring integrally including the biasing portion configured to bias the lock portion in the lock direction and the biasing portion configured to bias the operation handle. This can reduce the number of parts and also improve the assemblability of the parts.

The lock member may be attached to the upper rail to be swingable in the vehicle front-rear direction about the swing fulcrum portion. The locked portion may be lock grooves aligned in the vehicle front-rear direction in each of left and right portions of the lower rail. The lock portion may be lock teeth aligned in the vehicle front-rear direction in each of left and right portions of the lock member. A first lock tooth and a first lock groove may be engaged with each other with no gap in the vehicle front-rear direction, the first lock tooth being one of left and right lock teeth closest to the swing fulcrum portion among the lock teeth, the first lock groove being one of the lock grooves engaging with the first lock tooth. A gap in the vehicle front-rear direction between a second lock tooth and a second lock groove may be smaller than each of gaps in the vehicle front-rear direction between third lock teeth and third lock grooves, the second lock tooth being the other one of the left and right lock teeth closest to the swing fulcrum portion, the second lock groove being one of the lock grooves engaging with the second lock tooth, the third lock teeth being the lock teeth other than the first lock tooth and the second lock tooth, the third lock grooves being lock grooves among the lock grooves engaging with the third lock teeth.

According to the aforementioned configuration, when the seat slide device receives impact load in the vehicle front-rear direction, the left and right lock teeth closest to the swing fulcrum portion come into contact with the lock grooves before the other lock teeth farther away from the swing fulcrum portion do. In this case, causing the left and right lock teeth closest to the swing fulcrum portion to engage with the lock grooves can prevent generation of force which deforms the other lock teeth in the lock member in the up-down direction. Accordingly, it is possible to reduce a deformation amount of the lock member and stabilize and improve lock strength.

BRIEF DESCRIPTION OF DRAWINGS

FIG. 16A is a plan view illustrating part of the operation handle.

FIG. 16B is a side view of the operation handle.

DETAILED DESCRIPTION

Figure 1:
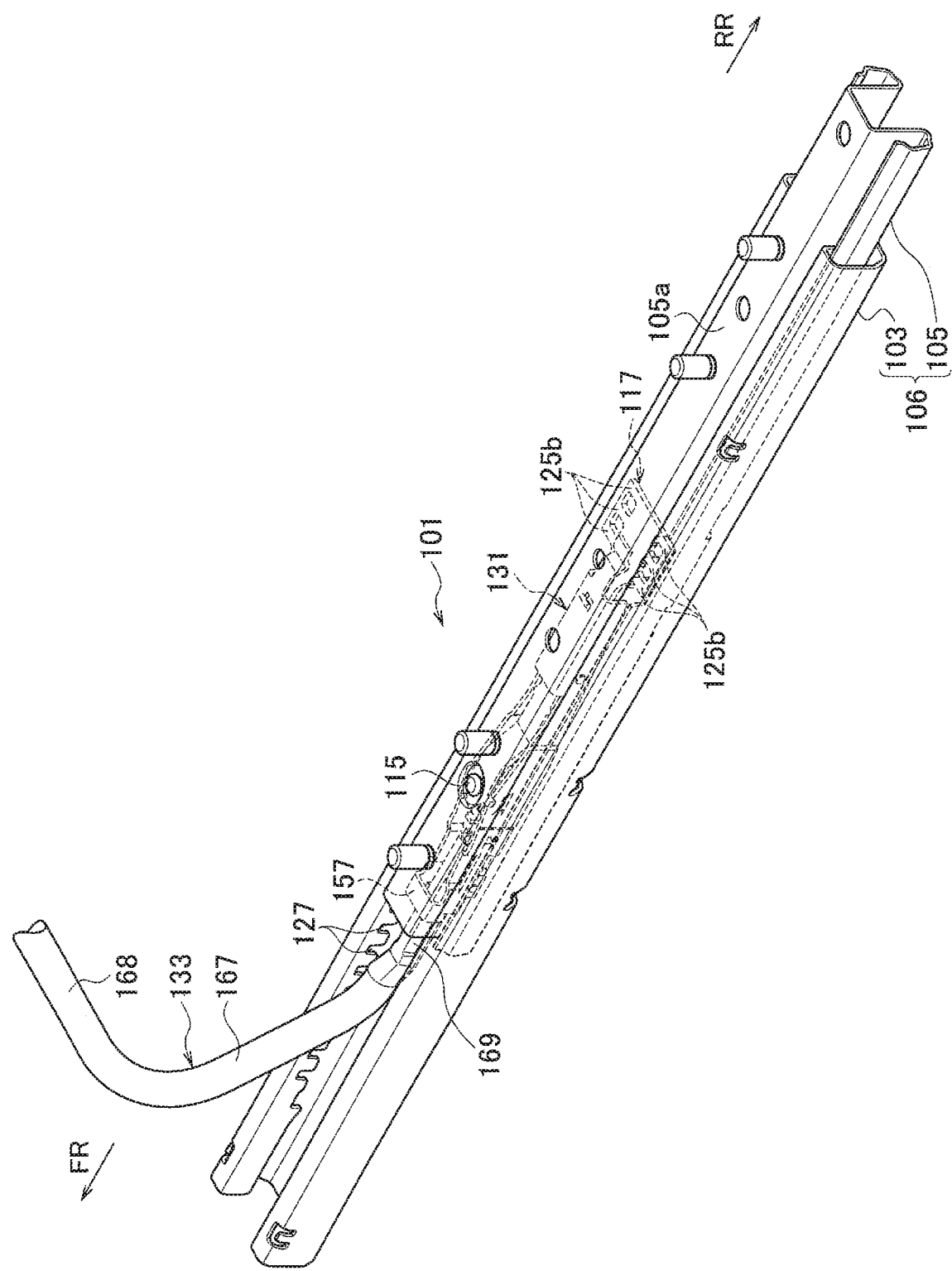
FIG. 1 is a perspective view illustrating an upper rail and a lower rail of a seat slide device according to a first embodiment of the present invention with a lock member, a release lever, and an operation handle assembled to the upper rail.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Description will be hereinbelow provided for an embodiment of the present invention by referring to the drawings. It should be noted that the same or similar parts and components throughout the drags will be denoted by the same or similar reference signs, and that descriptions for such parts and components will be omitted or simplified. In addition, it should be noted that the drawings are schematic and therefore different from the actual ones.

First Embodiment

Figure 2:
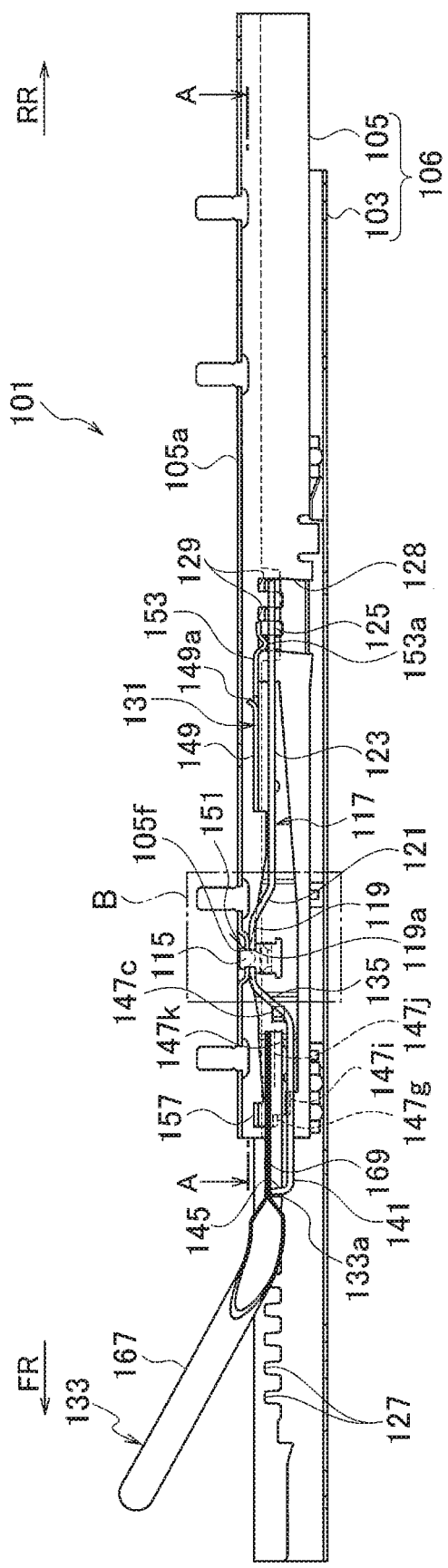
FIG. 2 is a side cross-sectional view of the seat slide device in FIG. 1.
Figure 3:
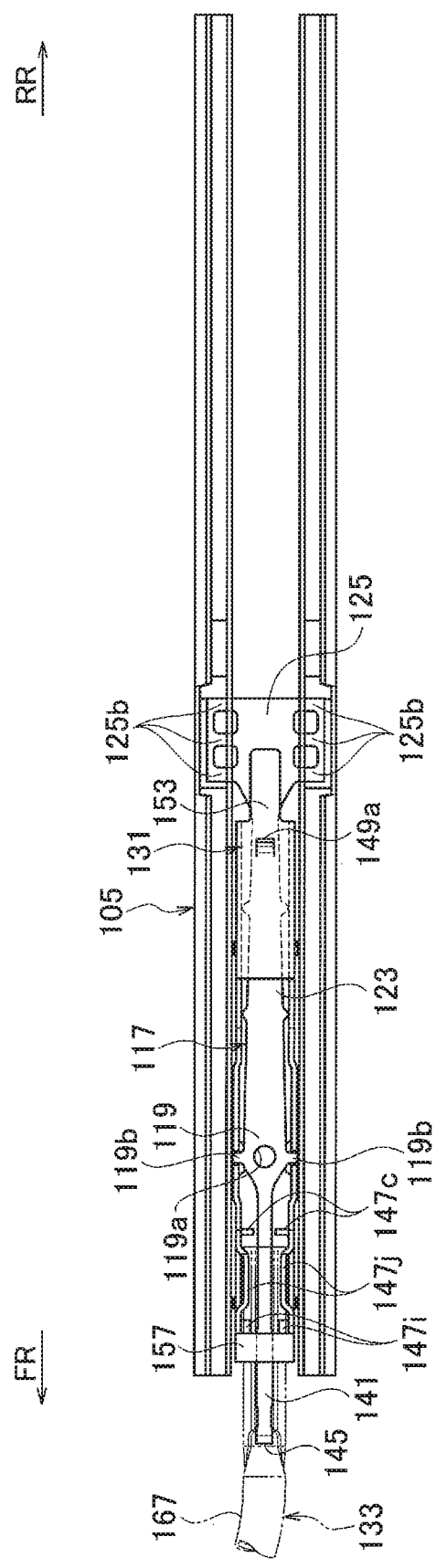
FIG. 3 is a cross sectional view along the line A-A with the lower rail in FIG. 2 omitted.

A seat slide device 101 according to a first embodiment of the present invention illustrated in FIGS. 1 to 4 is a manual seat slide device in which the position of a vehicle seat n a front-rear direction is adjusted manually. The seat slide device 101 includes a lower rail 103 installed on a floor surface of a vehicle and extending in a vehicle front-rear direction (hereafter, simply referred to as front-rear direction in some cases) and an upper rail 105 installed on a back surface of a seating portion (not illustrated) of a seat and assembled to be movable inside the lower rail 103 relative thereto in a longitudinal direction of the lower rail 103. The lower rail 103 and the upper rail 105 form a rail body 106 and paired left and right rail bodies (a pair of rail bodies) 106 are provided. In FIGS. 2 and 3, illustration of the lower rail 103 is omitted. Note that, in the following description (including second and third embodiments), "front" is the vehicle front FR side which is the left side in FIGS. 2 and 3, "rear" is the vehicle rear RR side which is the right side in FIGS. 2 and 3, and "left-right" is the left-right direction in the case where a viewer views an object from the rear side of the vehicle facing the front side of the vehicle.

Figure 4:
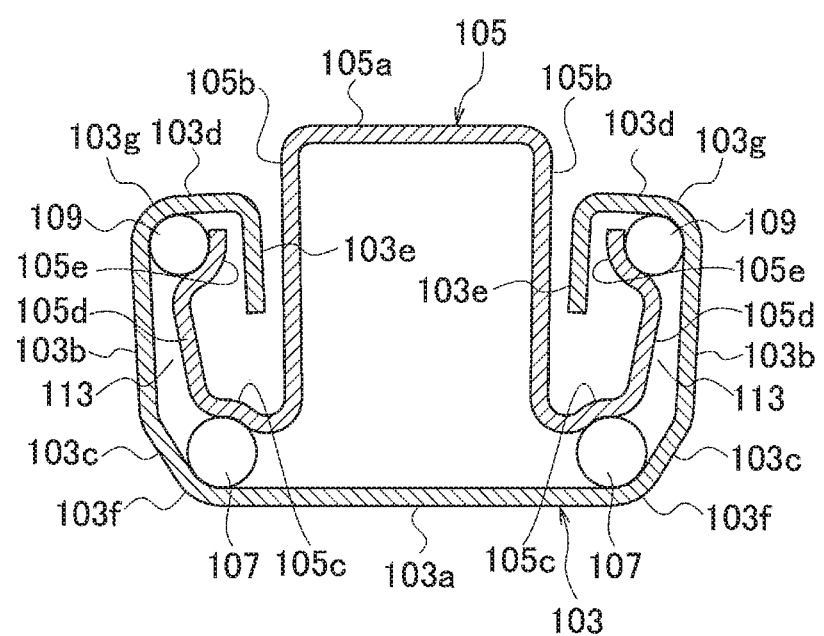
FIG. 4 is a cross-sectional view including lower guide balls and upper guide balls arranged between the upper rail and the lower rail.

As illustrated in FIG. 4, the lower rail 103 includes a lower-rail bottom wall 103a having a rectangular plate shape extending in the vehicle front-rear direction. Paired left and right lower-rail outer walls 103b stand up from both end edges of the lower-rail bottom wall 103a in a vehicle width direction while tilting slightly outward above the lower-rail bottom wall 103a. A lower-rail tilted wall 103c is formed between the lower-rail bottom wall 103a and a lower end of each of the paired left and right lower-rail outer walls 103b. Paired left and right lower-rail upper walls 103d are provided to extend from upper end edges of the paired left and right lower-rail outer walls 103b toward each other parallel to the lower-rail bottom wall 103a.

Paired left and right lower-rail inner walls 103e are provided to hang down from inner end edges of the paired left and right lower-rail upper walls 103d toward the lower-rail bottom wall 103a. Note that a gap between the lower-rail inner walls 103e arranged parallel to and facing each other is set large enough to allow movement of the upper rail 105 housed in the lower rail 103.

The upper rail 105 includes an upper-rail top wall 105a having a rectangular plate shape extending in the vehicle front-rear direction. Paired left and right upper-rail side walls 105b hang down from both end edges of the upper-rail top wall 105a in the vehicle width direction. Upper-rail lower tilted walls 105c stand up obliquely outward and upward from lower end edges of the upper-rail side walls 105b. Upper-rail upper tilted walls 105e are provided on upper end edges of the paired left and right upper-rail lower tilted walls 105c via bent portions 105d and stand up obliquely upward toward the lower-rail upper walls 103d.

Lower guide balls 107 are rotatably arranged between lower arc portions 103f of the lower rail 103 and the upper-rail lower tilted walls 105c of the upper rail 105, the lower arc portions 103f formed between the lower-rail bottom wall 103a and the lower-rail tilted walls 103c of the lower rail 103. Upper guide balls 109 are rotatably arranged between upper arc portions 103g of the lower rail 103 and the upper-rail upper tilted walls 105e of the upper rail 105, the upper arc portions 103g formed between the lower rail outer walls 103b and the lower-rail upper walls 103d of the lower rail 103.

Figure 5:
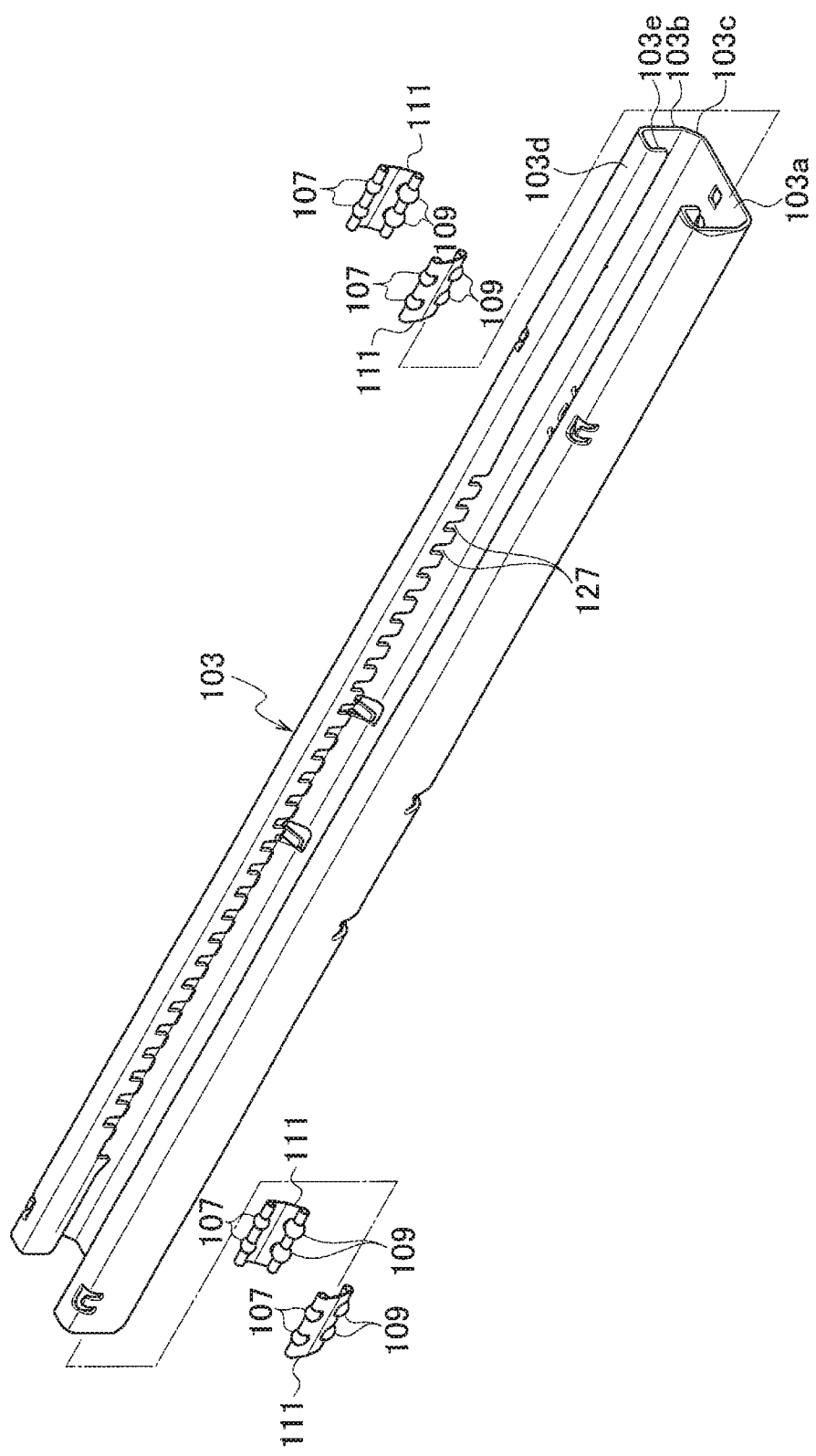
FIG. 5 is a perspective view of the lower rail and ball retainers including the lower guide balls and the upper guide balls in FIG. 4.

As illustrated in FIG. 5, the lower guide balls 107 and the upper guide balls 109 are rotatably supported in ball retainers 111 omitted in FIG. 4. Each ball retainer 111 supports total of four balls which are two lower guide balls 107 and two upper guide halls 109. The ball retainers 111 supporting the lower guide balls 107 and the upper guide balls 109 are arranged at two positions on the front and the rear sides in a housing portion 113 (FIG. 4) surrounded by the lower-rail outer walls 103b, the lower-rail tilted wall 103c, the lower-rail upper walls 103d, and the lower-rail inner walls 103e and are arranged at a total of four positions in the paired left and right rail bodies 106.

As illustrated in FIG. 2, a lock member 117 is fixed to the upper-rail top wall 105a in a front portions of the upper rail 105 by using a fastener 115 such as a rivet. The lock member 117 is formed of a plate-shaped spring member. The lock member 117 has a fixation hole 119a to which the fastener 115 is inserted, in a fixation portion 119 which is a base fixed to the upper-rail top wall 105a by using the fastener 115. In the upper-rail top wall 105a of the upper rail 105, a portion around an upper-rail fixation hole 105f is formed to be recessed downward relative to other portions of the upper-rail top wall 105a. A head portion of the fastener 115 is thereby set not to protrude from upper surfaces of the other portions of the upper-rail top wall 105a in the upper rail 105.

Figure 8A:
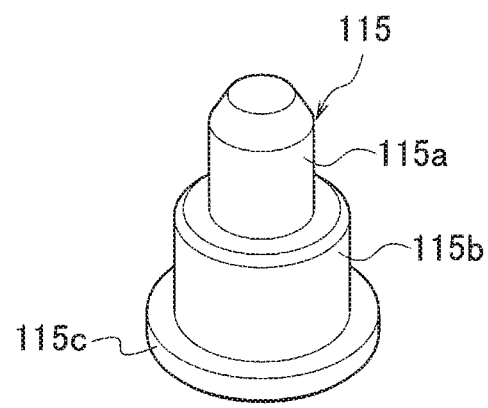
FIG. 8A is a perspective view of a fastener.
Figure 8B:
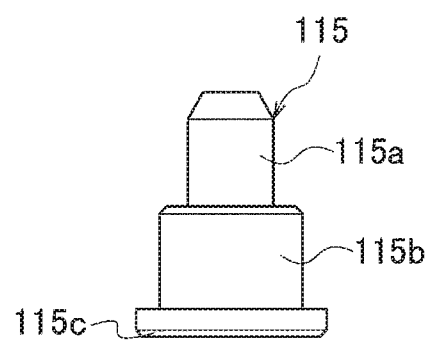
FIG. 8B is a side view of the fastener.
Figure 9:
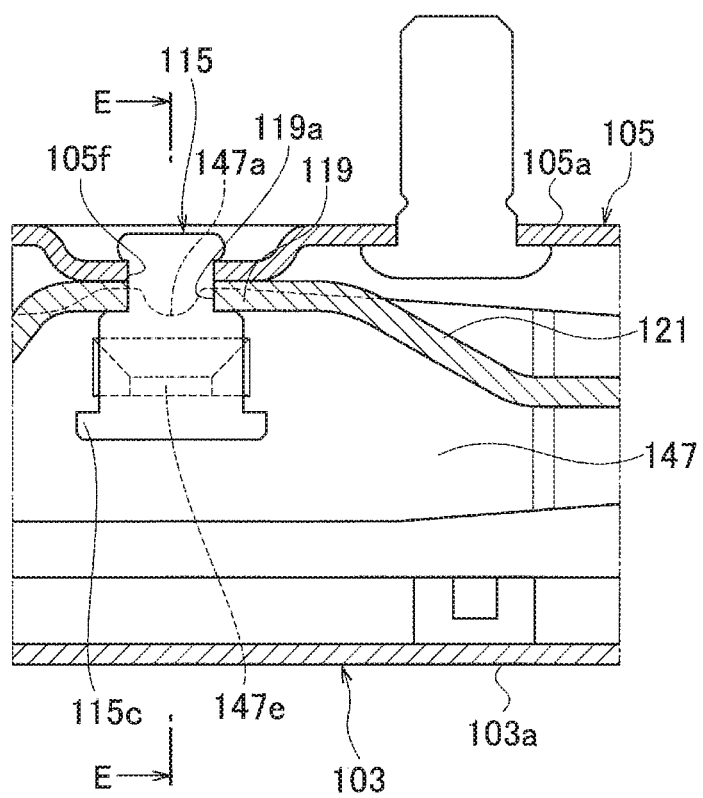
FIG. 9 is an enlarged view of the portion B in FIG. 2.

FIGS. 8A and 8B illustrate the fastener 115 before attachment. As illustrated in FIG. 9 which is an enlarged view of the portion B in FIG. 2, the fastener 115 includes an insertion shaft portion 115a inserted into the fixation hole 119a and the upper-rail fixation hole 105f from below, a large-diameter portion 115b formed below the insertion shaft portion 115a and having a larger diameter than the insertion shaft portion 115a, and a flange 115c formed below the large-diameter portion 115b, that is on the opposite side of the large-diameter portion 115b to the insertion shaft portion 115a. The flange 115c forms a protrusion projecting sideways.

Figure 10:
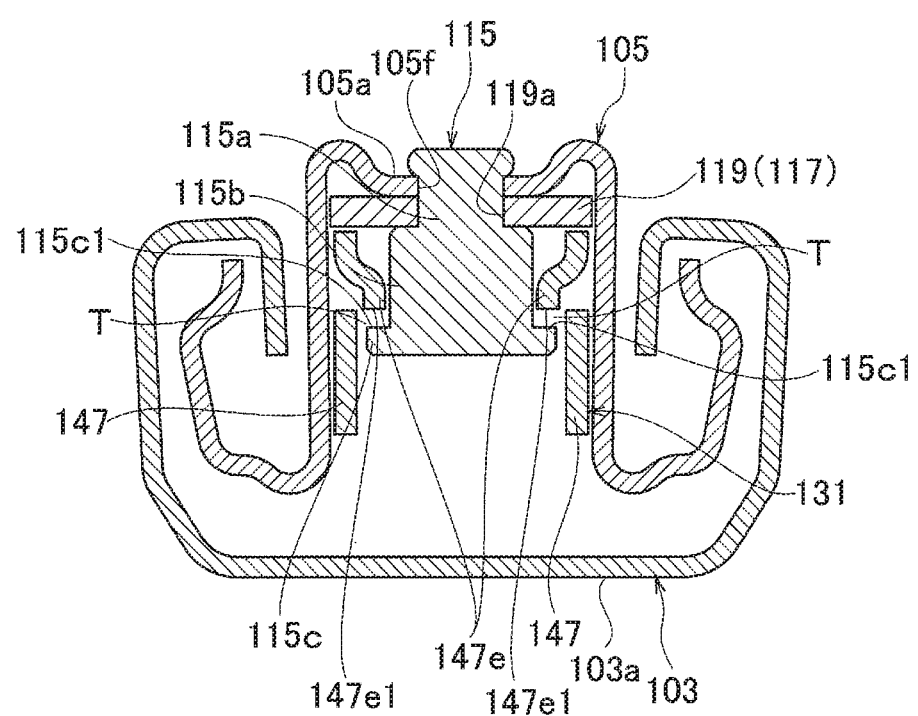
FIG. 10 is a cross-sectional view along the line E-E in FIG. 9.
Figure 11:
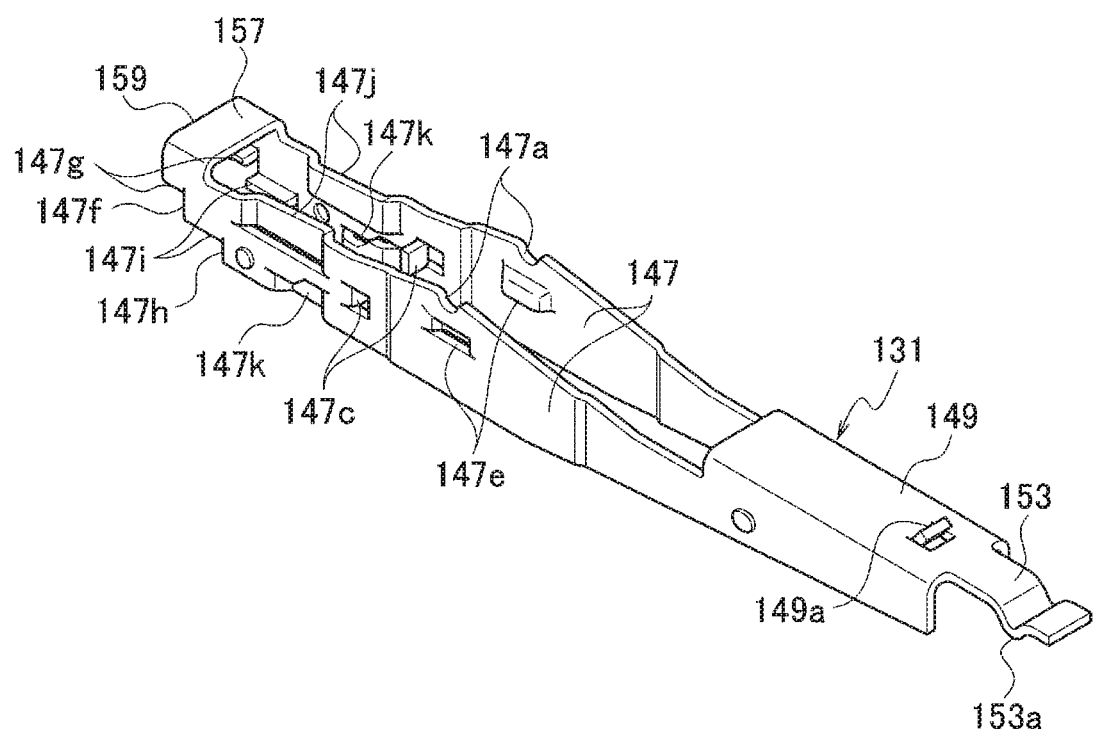
FIG. 11 is a perspective view of the release lever.

As illustrated in FIG. 9 and FIG. 10 which is a cross-sectional view along the line E-E in FIG. 9, the flange 115c is located below lock protrusions 147e provided in left and right side walls 147 of a later-described release lever 131 illustrated in FIG. 11. As illustrated in FIG. 11, the lock protrusions 147e are located slightly in front of the center position of the release lever 131 in the front-rear direction and are formed by cutting and raising the side walls 147 being part of the release lever 131 toward the inner side.

As illustrated in FIG. 10, upper portions of the lock protrusions 147e are continuous with the side walls 147 and lower portions of the lock protrusions 147e are cut off from the side walls 147. Cut-off lower end surfaces 147e1 of the lock protrusions 147e face an upper surface 115c1 of the flange 115c. A gap T is formed between the lower end surfaces 147e1 and the upper surface 115c1. Providing the gap T allows the release lever 131 to swing in the front-rear direction with a swing fulcrum portion 151 acting as a fulcrum, the swing fulcrum portion 151 being a portion where the fastener 115 is provided.

Figure 7:
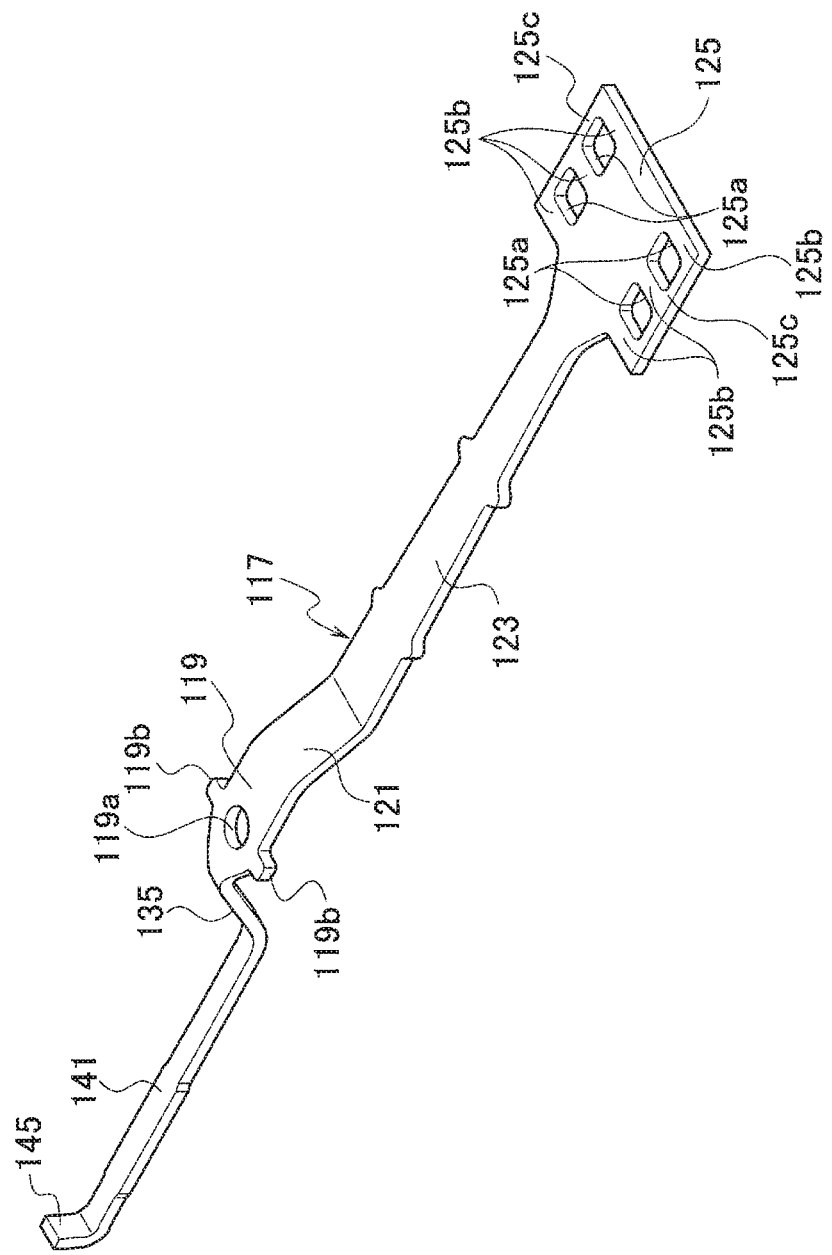
FIG. 7 is a perspective view of a lock member.

The fixation portion 119 of the lock member 117 illustrated in FIG. 7 extends in the front-rear direction substantially parallel to the upper-rail top wall 105a illustrated in FIG. 2 and a rear tilted portion 121 is formed to be tilted downward while extending from a rear end of the fixation portion 119 toward the rear side. A rear elastic deformation portion 123 is formed to extend rearward from a rear end of the rear tilted portion 121 substantially parallel to the fixation portion 119. As illustrated in FIG. 3, a rear end 125 of the rear elastic deformation portion 123 has a larger width in the left-right direction (up-down direction in FIG. 3) than the rear elastic deformation portion 123 and has a rectangular shape in a plan view. The rear elastic deformation portion 123 forms a rear biasing portion.

Two rectangular holes 125a are formed to be aligned in the front-rear direction near each of left and right edges of the rear end 125. Portions of the rear end 125 adjacent to the holes 125a in the front-rear direction form lock teeth 125b which are lock portions protruding leftward and rightward. The lock teeth 125b are formed at three positions on each of the left and right sides. Distal ends of the lock teeth 125b at the three positions on each of the left and right sides are configured to be connected to one another by a connecting portion 125c extending in the front-rear direction.

Figure 6:
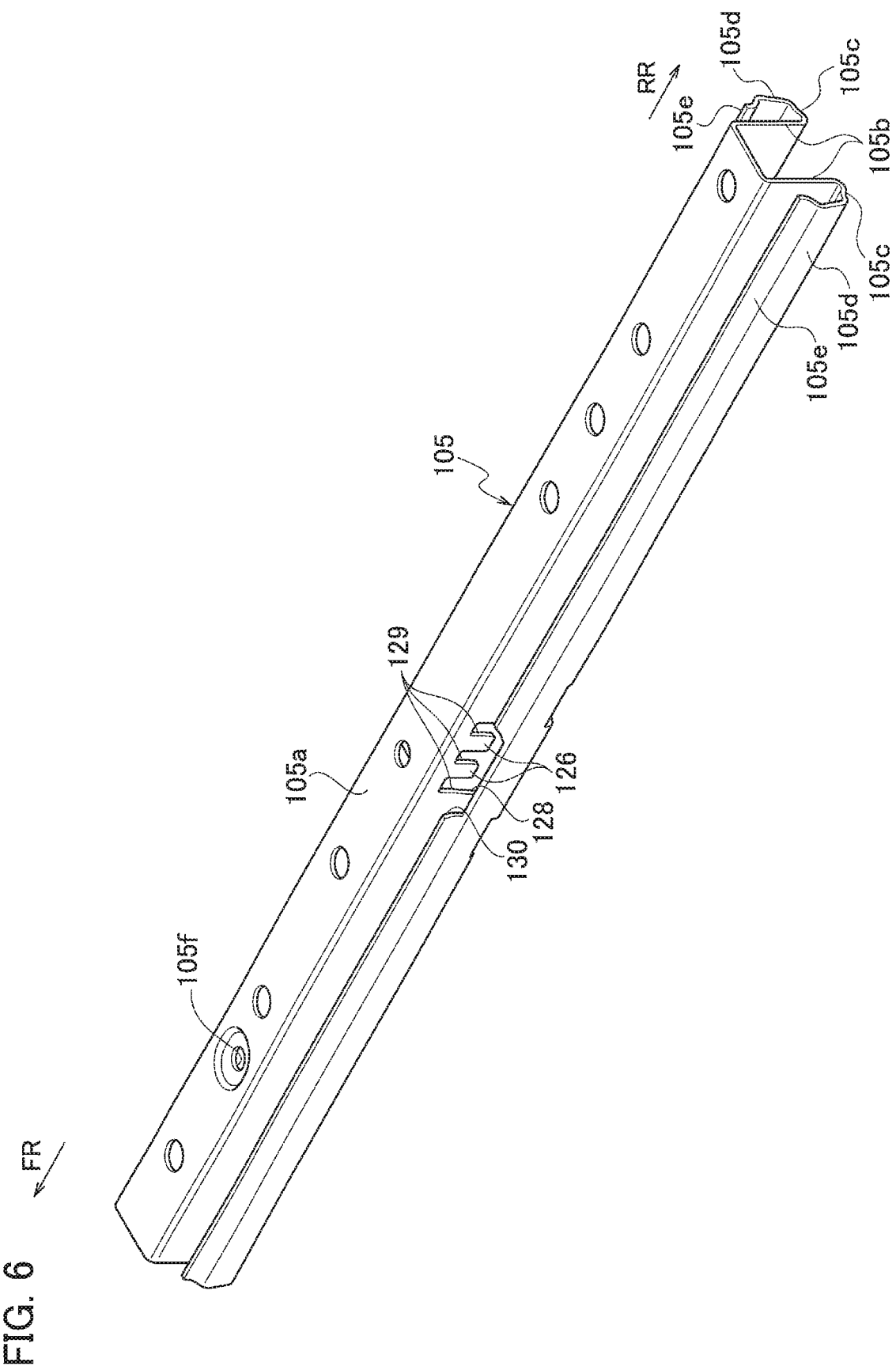
FIG. 6 is a perspective view of the upper rail.

As illustrated in FIG. 6, lock tooth receiving recesses 129 are formed near a substantially-center portion of the upper rail 105 in the front-rear direction to extend from the left and right upper-rail side walls 105b to the left and right upper-rail lower tilted walls 105c and are formed at three positions on each of the left and right sides to be aligned in the front-rear direction. As illustrated in FIG. 2, the three lock teeth 125b of the lock member 117 are inserted into the lock tooth receiving recesses 129 at the three positions from below. The width of each lock tooth receiving recess 129 in the front-rear direction is greater than the width of each of later-described lock grooves 127 of the lower rail 103 in the front-rear direction. In this configuration, projections 126 between the lock tooth receiving recesses 129 are inserted into the holes 125a of the lock member 117. In this case, in order to avoid interference between the upper rail 105 and portions around the connecting portions 125c of the rear end 125, an opening 128 continuous with lower portions of the lock tooth receiving recesses 129 and a notch opening 130 formed in the upper-rail tilted wall 105e are provided on each of the left and right sides of the upper rail 105.

Moreover, as illustrated in FIG. 5, multiple lock grooves 127 which are locked portions are provided in the left and right lower rail 103 except for positions near front portions and rear portions of the lower-rail inner walls 103e to be aligned in the front-rear direction. The lock member 117 is set to a state locked to the lower rail 103 by inserting the lock teeth 125b of the lock member 117 into the lock grooves 127 from below with the lock teeth 125b located in the lock tooth receiving recesses 129. The upper rail 105 to which the lock member 117 is attached is thereby restricted in movement relative to the lower rail 103 in the front-rear direction.

In the lock member 117, the rear elastic deformation portion 123 generates upward elastic force in the state where the lock member 117 is attached to the upper rail 105 and this maintains the state where the lock teeth 125b are inserted in the lock grooves 127. Operating an operation handle 133 illustrated in FIGS. 1 and 2 upward in this state causes the rear end 125 of the lock member 117 to be pushed downward via the release lever 131 and the lock is released. The operation handle 133 is inserted into the upper rail 105 from the front side and is arranged to operate in conjunction with the release lever 131.

As illustrated in FIGS. 3 and 7, the lock member 117 includes protrusions 119b which are supported portions protruding sideways from left and right portions of the fixation portion 119 at positions corresponding to the fixation hole 119a. The protrusions 119b protrude sideways while having the same thickness as the plate thickness of the lock member 117 including the fixation portion 119 and have a rectangular shape in the plan view. As illustrated in FIGS. 2 and 7, in the lock member 117, a front tilted portion 135 is formed in front of the fixation portion 119, that is on the opposite side to the rear tilted portion 121 across the fixation portion 119. The front tilted portion 135 is tilted downward while extending forward.

A front elastic deformation portion 141 is formed to extend forward from a front end (lower end) of the front tilted portion 135 substantially parallel to the fixation portion 119. The front elastic deformation portion 141 forms a front biasing portion.

Figure 15:
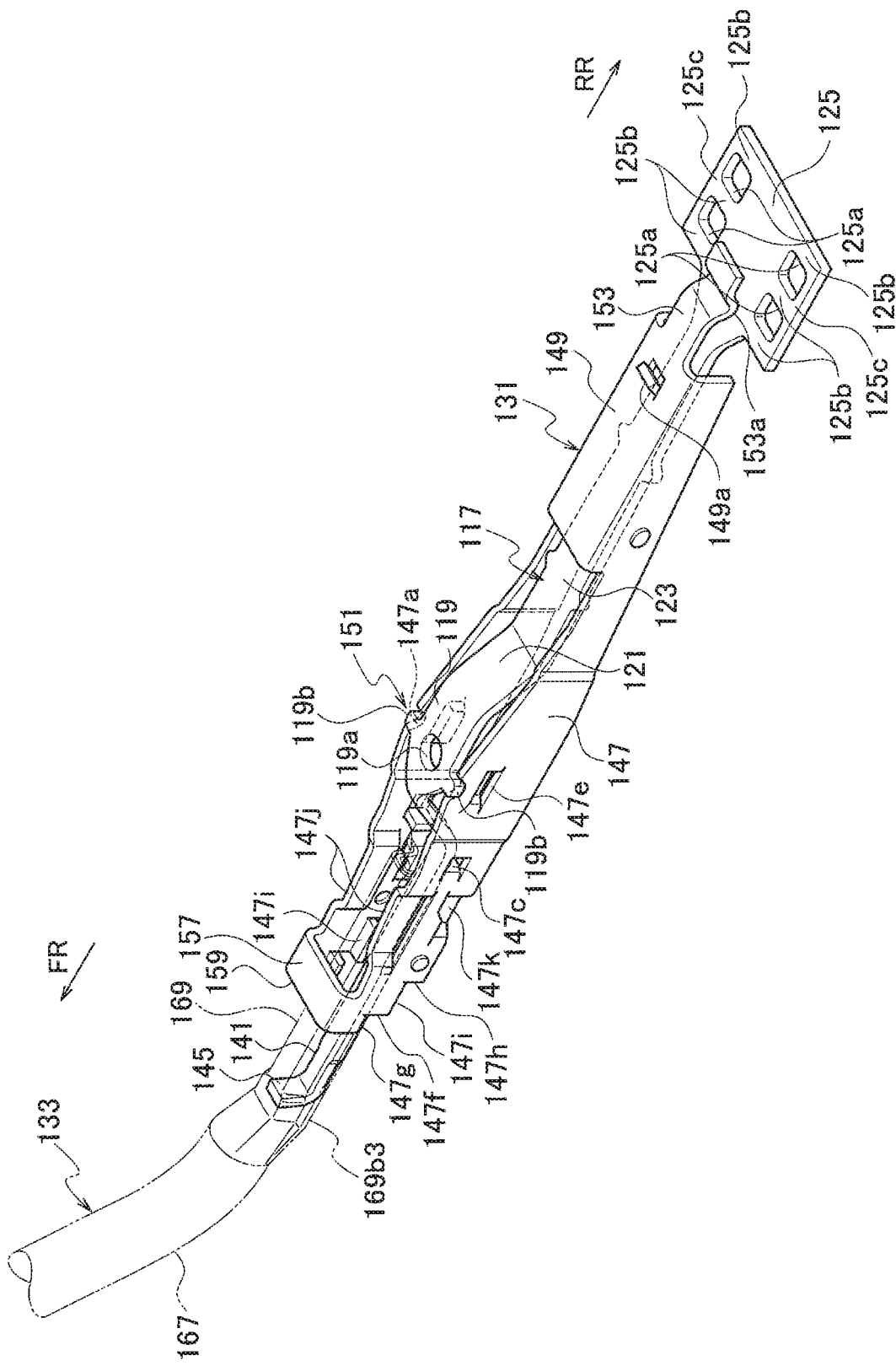
FIG. 15 is a perspective view illustrating a state where the lock member is assembled to the release lever, together with the operation handle.

A front end claw 145 which is a fitting projection bent upward is formed at a front end of the front elastic deformation portion 141. As illustrated in FIGS. 2 and 15, the front end claw 145 is fitted to a fitting recess 133a formed on a lower surface of the operation handle 133 from below. The front elastic deformation portion 141 presses the fitting recess 133a upward via the front end claw 145. The pressing force of the front elastic deformation portion 141 applied to the fitting recess 133a is set to be smaller than the pressing force of the rear elastic deformation portion 123 applied to the lock grooves 127 via the lock teeth 125b.

As illustrated in FIG. 2, a portion of the front elastic deformation portion 141 on the front side of the substantial center in the front-rear direction protrudes forward beyond the upper rail 105 in the state where the lock member 117 is attached to the upper rail 105.

As illustrated in FIGS. 11 to 14, the release lever 131 includes the left and right side walls 147 and an upper wall 149 connecting upper ends of the side walls 147 in a region around rear ends of the left and right side walls 147. The lock member 117 except for portions around the front and rear portions is arranged between the left and right side walls 147 of the release lever 131. In other words, the release lever 131 is provided at a position overlapping the lock member 117 in the up-down direction and the longitudinal direction of the upper rail 105.

Recesses 147a which are supporting portions are formed in upper ends of the side walls 147, in front of the center position of the release lever 131 in the front-rear direction. The recesses 147a are located above the lock protrusions 147e and have a recess curved shape which is an arc shape open on the upper side. As illustrated in FIG. 15, the recesses 147a are arranged below the left and right protrusions 119b of the lock member 117 and lower portions of the protrusions 119b engage with the recesses 147a. The protrusions 119b of the lock member 117 and the recesses 147a of the release lever 131 form the swing fulcrum portion 151 in the case where the release lever 131 and the operation handle 133 integrally swing in the up-down direction. The position of the swing fulcrum portion 151 matches the position of the fixation portion of the lock member 117 to the upper rail 105 in the front-rear direction.

The release lever 131 includes a release pressing portion 153 extending rearward from the upper wall 149. A curved protrusion 153a protruding to curve downward is formed in a lower portion of the release pressing portion 153 on the distal end side. The curved protrusion 153a comes into contact with an upper surface of the rear end 125 of the rear elastic deformation portion 123 in the lock member 117. A projection 149a is formed in the upper wall 149 by cutting and raising the upper wall 149 upward. The projection 149a functions as a stopper which comes into contact with the upper-rail top wall 105a of the upper rail 105 when the release lever 131 and the operation handle 133 swing and turn clockwise in FIG. 2 with the swing fulcrum portion 151 acting as a fulcrum.

Upper ends of front ends of the release lever 131 are connected to each other by a front upper wall 157. Notches 147f are formed in front end lower portions of the left and right side walls 147 and front upper guide projections 147g protruding to be bent from the side walls 147 toward each other are formed above the left and right notches 147f. Distal ends of the left and right front upper guide projections 147g are spaced away from each other and a gap is formed between the distal ends.

Rear notches 147h are formed below and behind the notches 147f and front lower guide projections 147i protruding to be bent from the side walls 147 toward each other are formed above the left and right rear notches 147h. A gap S1 (FIGS. 13 and 14) in the up-down direction is formed between the front upper guide projections 147g and the front lower guide projections 147i.

Rear upper guide projections 147j protruding toward each other are formed in upper portions of the side walls 147 behind the front upper guide projections 147g. The rear upper guide projections 147j are formed by causing the upper ends of the side walls 147 to protrude in a bridge shape along the longitudinal direction and are formed to elongate in the front-rear direction. Rear lower guide projections 147k protruding toward each other are formed in lower portions of the side walls 147 behind the front lower guide projections 147i. The rear lower guide projections 147k are formed by causing lower ends of the side walls 147 to protrude in a bridge shape along the longitudinal direction and are located below rear portions of the rear upper guide projections 147j.

Figure 13:
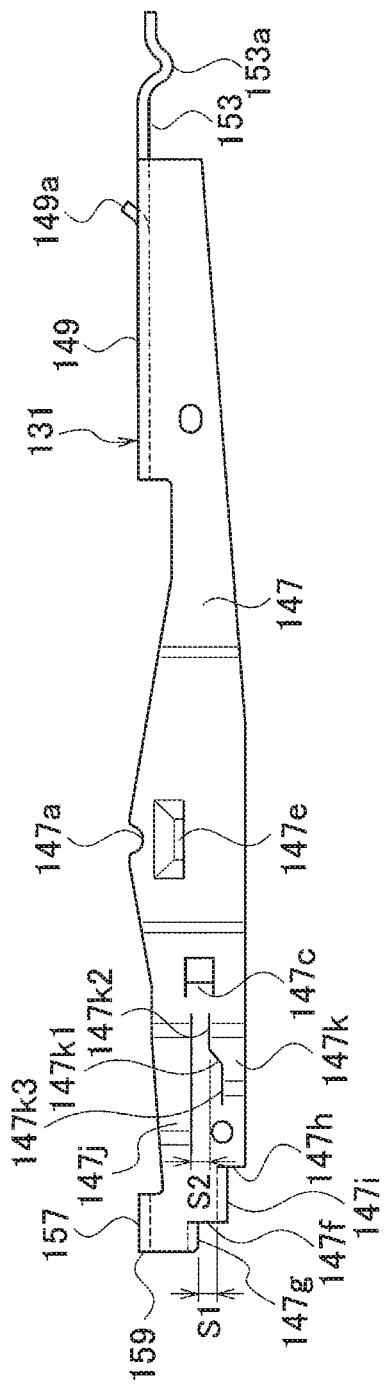
FIG. 13 is a side view of the release lever.
Figure 14:
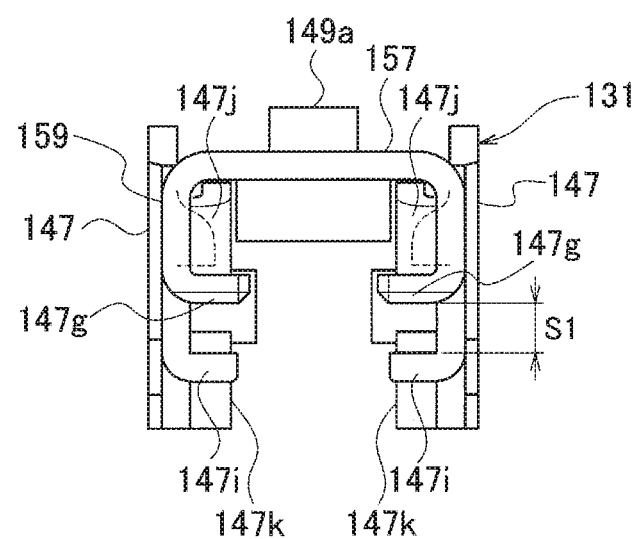
FIG. 14 is a front view of the release lever as viewed from the front side.

As illustrated in FIG. 13, a tilted guide surface 147k1 is formed in an upper end edge of each rear lower guide projection 147k facing the rear upper guide projection 147j to be tilted such that a rear portion is located above a front portion. A gap S2 in the up-down direction is formed between the rear upper guide projection 147j and an upper end surface 147k2 continuous with a rear end of the tilted guide surface 147k1.

The upper end surface 147k2 of the rear lower guide projection 147k is located between the front upper guide projection 147g and the front lower guide projection 147i in the up-down direction and a front upper end surface 147k3 continuous with a front end of the tilted guide surface 147k1 is located below an upper end surface of the front lower guide projection 147i. A lower end surface of the rear upper guide projection 147j is located above a lower end surface of the front upper guide projection 147g. Accordingly, the gap S2 is located above the gap S1 as a whole.

The gap S1 is greater than the gap S2 (S1>S2). Flanges 169b3 (FIGS. 16A to 18) of the release lever 131 to be described later are inserted into the gap S1 and the gap S2. A portion of the release lever 131 corresponding to a portion between left and right side walls 169b2 is inserted between the left and right front upper guide projections 147g and between the left and right rear upper guide projections 147j illustrated in FIG. 14.

Force operating and turning the operation handle 133 upward in a lock release direction is applied to the front upper guide projections 147g via the flanges 169b3 from below in an upward direction. In this case, a rear end of the operation handle 133 is pressed downward from above against the upper end surfaces 147k2 of the rear lower guide projections 147k via the flanges 169b3. Accordingly, a portion around the front end of the release lever 131 where the front upper guide projections 147g and the rear lower guide projections 147k are provided serves as an operation portion 159 to which force operating the operation handle 133 is applied. In other words, the front upper and lower guide projections 147g, 147i and the rear upper and lower guide projections 147j, 147k are provided in the operation portion 159. The operation portion 159 is arranged in front of the swing fulcrum portion 151, that is on the opposite side to the release pressing portion 153 on the rear side across the swing fulcrum portion 151.

As illustrated in FIGS. 16A and 16B, the operation handle 133 includes paired left and right arms 167 provided respectively for the paired left and right rail bodies 106 illustrated in FIG. 1 and a grip 168 extending in the vehicle width direction to connect the paired arms 167 to each other and has a substantially U-shape as a whole. Note that, in FIGS. 16A and 16B, portions around the left arm 167 are illustrated and the right arm 167 is omitted. The paired arms 167 extend in the front-rear direction and are inserted respectively into the left and right upper rails 105 from front ends thereof. The grip 168 is gripped by an occupant when the occupant operates the operation handle 133.

As illustrated in FIGS. 2 and 15, a rear end portion of the arm 167 is inserted between the left and right side walls 147 of the release lever 131. The arm 167 is formed of a cylindrical member as a whole including the grip 168. A portion of the arm 167 behind the portion including the fitting recess 133a described above is a coupling portion 169 serving as a rear connecting portion having a shape of the cylindrical portion crushed from above and below.

Figure 17:
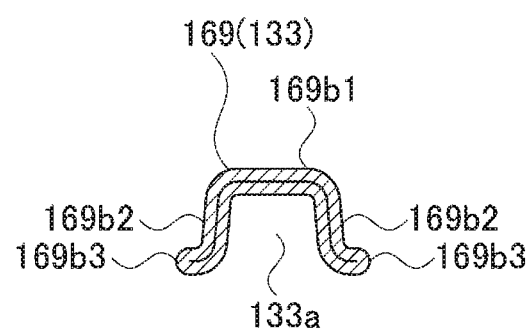
FIG. 17 is a cross-sectional view along the line F-F in FIG. 16B.
Figure 18:
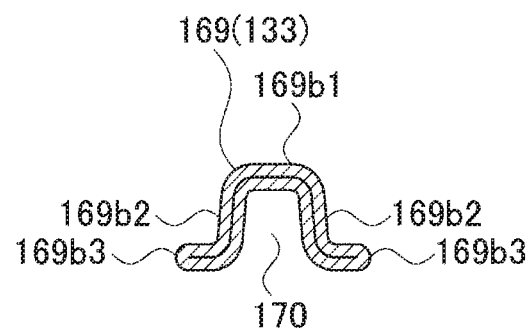
FIG. 18 is a cross-sectional view along the line G-G in FIG. 16B.

As illustrated in FIGS. 16A to 18, the coupling portion 169 has a substantially hat-shaped cross section. Specifically, the coupling portion 169 includes an upper surface 169b1, side surfaces 169b2 extending downward from left and right ends or the upper surface 169b1, and the flanges 169b3 extending leftward and rightward from lower ends of the left and right side surfaces 169b2 substantially parallel to the upper surface 169b1. A lower portion of the hat shape is open and, as illustrated in FIG. 18, is a recess 170 located above the front elastic deformation portion 141 of the lock member 117.

As described above, the flanges 169b3 are in a state inserted and arranged in the gap S1 and gap S2. In this state, the force operating the operation handle 133 upward is applied to the lower surfaces of the front upper guide projections 147g via the flanges 169b3 from below. Moreover, as described above, the portion of the operation handle 133 including the side surfaces 169b2 located above the flanges 169b3 is inserted between the left and right front upper guide projections 147g and between the left and right rear upper guide projections 147j. Accordingly, an interval between the left and right side walls 169b2 of the hat shape is smaller than an interval between the left and right front upper guide projections 147g and an interval between the left and right rear wiper guide projections 147j.

As illustrated in FIGS. 17 and 18, in the coupling portion 169, the width of the upper surface 169b1 in the left-right direction is large in a front end (portion illustrated in FIG. 17 corresponding to the cross section F-F in FIG. 16B) in which the front end claw 145 of the lock member 117 is inserted and is small in a rear portion behind the front end (portion illustrated in FIG. 18 corresponding to the cross section G-G in FIG. 16B). Accordingly, the front end claw 145 fitted to the fitting recess 133a is restricted in movement in the front-rear direction relative to the operation handle 133.

Figure 12:
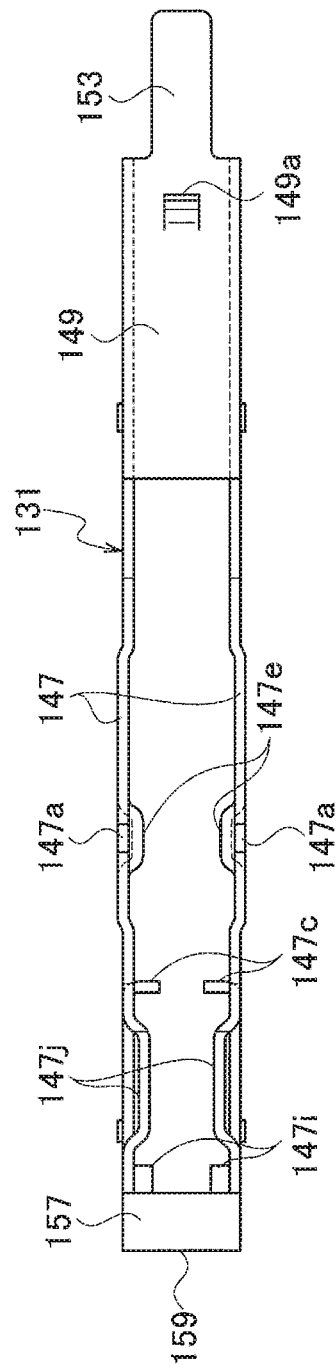
FIG. 12 is a plan view of the release lever.

As illustrated in FIGS. 11 to 13, the left and right side walls 147 of the release lever 131 are provided with paired left and right protrusions 147c located at positions behind a rear end of the coupling portion 169 to face it. The protrusions 147c protrude inward from the side walls 147 of the release lever 131 by being cut and raised from the side walls 147 and are spaced away from a rear end surface of the coupling portion 169 in an assembled state of the operation handle 133 in which the front end claw 145 is fitted to the fitting recess 133a.

As illustrated in FIG. 15, the front lower guide projections 147i are located below the flanges 169b3 in a front end of the release lever 131. When the grip 168 of the operation handle 133 is pushed downward in this state, the operation handle 133 swings counterclockwise in FIG. 2 with the front lower guide projections 147i acting as a fulcrum while causing the front elastic deformation portion 141 to elastically deform. In this case, the coupling portion 169 behind the front lower guide projections 147i moves upward and the flanges 169b3 come into contact with the rear upper guide projections 147j from below. This restricts more-than-necessary downward movement of the grip 168 of the operation handle 133. In this case, in the release lever 131, the lock protrusions 147e come into contact with the flange 115c of the fastener 115 to prevent the recesses 147a from disengaging from the protrusions 119b of the lock member 117 and the projection 149a provided on the upper wall 149 in the rear portion of the release lever 131 comes into contact with the upper-rail top wall 105a of the upper rail 105 from below to restrict the swinging.

Next, operations of the seat slide device 101 configured as described above are described.

FIGS. 1 to 3 illustrate a lock maintained state in which the lock teeth 125b of the lock member 117 are locked by engaging with the lock grooves 127 of the lower rail 103. When the occupant operates the operation handle 133 upward in this state, in the operation handle 133, rear portions of the flanges 169b3 push the upper end surfaces 147k2 of the rear lower guide projections 147k downward and front portions of the flanges 169b3 push lower end surfaces of the front upper guide projections 147g upward. In this case, upward operation force of the operation handle 133 is transmitted to the release lever 131 via the operation portion 159.

The operation handle 133 thereby swings and turns clockwise in FIG. 2 about the swing fulcrum portion 151 integrally with the release lever 131. In this case, the swinging and turning of the release lever 131 causes the curved protrusion 153a of the release pressing portion 153 on the rear side to push down the rear end 125 corresponding to the portion around the lock portion in the lock member 117 and the rear elastic deformation portion 123 elastically deforms downward. In other words, the release pressing portion 153 is capable of pressing the portion around the lock teeth 125b in the lock member 117. As a result, the lock teeth 125b disengage from the lock grooves 127 of the lower rail 103 and the lock is released. When the lock is released, the not-illustrated seat can be moved together with the upper rail 105, in the front-rear direction relative to the floor surface of the vehicle on the lower rail 103 side and the seat position desired by the occupant can be achieved.

When the occupant releases his or her hand from the operation handle 133 with the seat position determined, the rear elastic deformation portion 123 of the lock member 117 pushes the release pressing portion 153 upward to cause the release lever 131 swing and turn and the seat slide device 101 returns to the lock maintained state in FIG. 2. In this case, the release lever 131 swings and turns counterclockwise in FIG. 2 about the swing fulcrum portion 151 together with the operation handle 133.

For example, assume a case where the vehicle is hit from behind and the heel of the occupant moves rearward and its the operation handle 133 in the state of FIG. 2. In this case, load received by the operation handle 133 causes the front end claw 145 to disengage from the fitting recess 133a and moves the operation handle 133 rearward. The rearward movement of the operation handle 133 causes the flanges 169b3 to come into contact with the protrusions 147c of the release lever 131 illustrated in FIGS. 2 and 3 and the rearward movement of the operation handle 133 relative to the release lever 131 is thereby restricted. When the protrusions 147c receive the rearward load from the operation handle 133, the recesses 147a in the swing fulcrum portion 151 disengage from the protrusions 119b of the lock member 117 and the release lever 131 moves rearward together with the operation handle 133.

This reduces impact received by the heel of the occupant when the heel hits the operation handle 133.

As illustrated in FIG. 15, the lock member 117 and the release lever 131 can be assembled into one unit before being assembled to the upper rail 105. The lower portion of the release lever 131 is open over the entire length in the longitudinal direction, and the lock member 117 is thus inserted between the left and right side walls 147 from the open side in the lower portion while being tilted. The lock member 117 is returned to a horizontal position with the fixation portion 119 including the protrusions 119b inserted to a position above the side walls 147 and is then moved downward to insert the protrusions 119b of the lock member 117 into the recesses 147a of the release lever 131.

In this case, the curved protrusion 153a of the release pressing portion 153 comes into contact with the upper surface of the rear end 125 of the lock member 117 and the portion of the front elastic deformation portion 141 in front of a portion around the center position in the front-rear direction protrudes forward beyond the front end of the release lever 131. As illustrated in FIGS. 1 to 3, the lock member 117 and the release lever 131 assembled into one unit as described above are inserted between the left and right upper-rail side walls 105b of the upper rail 105 and the fixation portion 119 of the lock member 117 is fixed to the upper-rail top wall 105a of the upper rail 105 by using the fastener 115. Since the lock member 117 and the release lever 131 can be assembled to the upper rail 105 in a state assembled into one unit in advance as described above, workability in assembly is improved.

The operation handle 133 is configured such that the coupling portion 169 is inserted into the release lever 131 from the front end opening thereof while the front elastic deformation portion 141 of the lock member 117 is made to warp downward with the lock member 117 and the release lever 131 assembled to the upper rail 105. The operation handle 133 is inserted by moving the recess 170 along the front elastic deformation portion 141. In this case, the width of the front end claw 145 of the lock member 117 in the left-right direction is greater than the width of the recess 170 in the left-right direction.

Accordingly, the front end claw 145 moves relative to the recess 170 while sliding below the recess 170 or in a state close to the recess 170, without engaging with the recess 170. Then, the flanges 169$b$3 of the coupling portion 169 are inserted into the gaps S1, S2 illustrated in FIGS. 13 and 14 and the front end claw 145 of the lock member 117 is inserted to a position corresponding to the fitting recess 133$a$. As a result, the front end claw 145 engages with the fitting recess 133$a$ and the assembly is completed. As described above, the operation handle 133 only needs to be inserted into the release lever 131 with the front elastic deformation portion 141 of the lock member 117 warped downward and the workability in assembly of the operation handle 133 is also improved.

When the flanges 169$b$3 are inserted in the gaps S1, S2, the front ends (rear ends) of the flanges 169$b$3 in the insertion direction come into contact with and are guided by the tilted guide surfaces 147$k$1 illustrated in FIG. 13. This facilitates the insertion into the gap S2 on the rear side. Since the front upper end surfaces 147$k$3 of the rear lower guide projections 147$k$ are located below the upper end surfaces of the front lower guide projections 147$i$, in the insertion, the front ends (rear ends) of the flanges 169$b$3 in the insertion direction are prevented from interfering with the front ends of the rear lower guide projections 147$k$ and more surely come into contact with the tilted guide surfaces 147$k$1.

Since the gap S2 is located above the gap S1 as a whole, the coupling portion 169 of the operation handle 133 is substantially parallel to the axial direction of the release lever 131 in the state where the coupling portion 169 is biased upward by the front elastic deformation portion 141. In this case, the upper surfaces of the flanges 169$b$3 come into contact with the lower surfaces of the front upper guide projections 147$g$ and gaps are formed between the flanges 169$b$3 and the front lower guide projections 147$i$. Meanwhile, the lower surfaces of the rear ends of the flanges 169$b$3 come into contact with the upper end surfaces 147$k$2 of the rear lower guide projections 147$k$ and gaps are formed between the flanges 169$b$3 and the rear upper guide projections 147$j$.

In the release lever 131, the left and right side walls 147 are arranged along the left and right upper-rail side walls 105$b$ of the upper rail 105 and the release pressing portion 153, the recesses 147$a$ (swing fulcrum portion 151), and the front upper guide projections 147$g$ in the operation portion 159 are substantially aligned in the front-rear direction. Accordingly the height of the release lever 131 in the up-down direction can be made small. Moreover, it is possible to efficiently arrange the release lever 131 in the small space inside the upper rail 105 and achieve the size reduction of the entire apparatus.

The lock member 117 in the first embodiment is formed of a plate spring integrally including: the fixation portion 119 including the swing fulcrum portion 151 and fixed to the upper rail 105; the rear elastic deformation portion 123 located behind the fixation portion 119 and configured to bias the lock teeth 125$b$ in the lock direction; and the front elastic deformation portion 141 located in front of the fixation portion 119 and configured to bias the release lever 131 and the operation handle 133 upward, the front elastic deformation portion 141 having biasing force set smaller than that of the rear elastic deformation portion 123.

As described above, in the first embodiment, the lock member 117 is a spring member in which a biasing portion (rear elastic deformation portion 123) configured to bias the lock teeth 125$b$ in the lock direction and a biasing portion (front elastic deformation portion 141) configured to bias the operation handle 133 upward are integrated. Accordingly, the number of parts can be reduced from that in the case where these two biasing portions are separately provided.

In the release lever 131, the release pressing portion 153 in the rear portion is biased upward by the rear elastic deformation portion 123 of the lock member 117. Meanwhile, as illustrated in FIG. 15, the flanges 169$b$3 of the operation handle 133 come into contact with the front upper guide projections 147$g$ of the release lever 131 from below. Accordingly, in the release lever 131, the front upper guide projections 147$g$ are biased upward by the front elastic deformation portion 141 via the operation handle 133 (flanges 169$b$3) in which the fitting recess 133$a$ is biased upward by the front elastic deformation portion 141.

As described above, the rear elastic deformation portion 123 having the upward biasing function is provided in the rear portion of the lock member 117 and the front elastic deformation portion 141 having the upward biasing function is provided in the front portion of the lock member 117. Moreover, the release lever 131 is swingably supported on the lock member 117 via the swing fulcrum portion 151 at substantially the center in the front-rear direction. Accordingly, two parts which are the lock member 117 and the release lever 131 can be assembled into one unit before being attached to the upper rail 105 and the workability in assembly is improved.

In the first embodiment, the operation handle 133 is inserted in the vehicle front-rear direction between a set of the front upper guide projections 147$g$ and the rear upper guide projections 147$j$ and a set of the front lower guide projections 147$i$ and the rear lower guide projections 147$k$, the guide projections 147$g$, 147$i$, 147$j$, 147$k$ provided in the operation portion 159 of the release lever 131. With the execution of the lock release operation, the operation handle 133 is operated in the lock release direction integrally with the release lever 131 with the swing fulcrum portion 151 acting as a fulcrum. Accordingly, the operation force of the operation handle 133 is efficiently transmitted to the release lever 131 and the lock release work can be smoothly performed.

In the swing fulcrum portion 151 in the first embodiment, the paired protrusions 119$b$ protruding from the left and right ends of the fixation portion 119 turnably engages with the paired recesses 147$a$ provided in the upper ends of the side walls of the release lever 131 and the engagement is maintained by the biasing force of the plate spring forming the lock member 117. In this configuration, the engagement state between the paired protrusions 119$b$ and the paired recesses 147$a$ can be maintained by using the lock member 117 without using an additional dedicated holding tool or the like. Accordingly, the structure can be simplified.

In the first embodiment, there is provided the fastener 115 configured to fix the fixation portion 119 of the lock member 117 to the lower surface of the upper rail 105. As illustrated in FIG. 10, the fastener 115 includes the flange (protrusion) 115$c$ protruding sideways on the opposite side to the upper-rail top wall 105$a$ of the upper rail 105 across the lock member 117. "Sideways" described herein is the direction toward the side walls 147 of the release lever 131 in FIG. 10. The release lever 131 includes the lock protrusions 147$e$ located above the flange 115$c$.

In this case, when the operation handle 133 is operated upward to cause the release lever 131 to swing and turn together with the operation handle 133 with the swing fulcrum portion 151 acting as a fulcrum or when the operation handle 133 is pushed downward, the release lever 131 sometimes receives downward force. However, in this case, the lock protrusions 147e of the release lever 131 come into contact with the flange 115c of the fastener 115 from above. This restricts the downward movement of the release lever 131 near the swing fulcrum portion 151 and can thereby prevent the recesses 147a of the release lever 131 from disengaging from the protrusions 119b of the lock member 117.

Moreover, the case where the lock teeth 125b of the lock member 117 do not enter the lock grooves 127 of the lower rail 103 and ride on the lower surfaces of the lower-rail inner walls 103e between the adjacent lock grooves 127 is conceivable. In this case, the release lever 131 receives no upward biasing force generated by the rear elastic deformation portion 123 of the lock member 117. However, since the lock protrusions 147e come into contact with the flange 115c from above, the release lever 131 is prevented from moving downward.

In other words, the flange 115c of the fastener 115 has a holding function of holding the release lever 131 to restrict the downward movement thereof. Such a holding function can be achieved only by providing the flange 115c in the fastener 115 and providing the lock protrusions 147e in the release lever 131 and there is no need to provide an additional dedicated holding function part. Accordingly, an increase in the number of parts can be suppressed.

When the lock member 117 is fixed to the upper rail 105 by using the fastener 115, the fastener 115 is inserted from below in FIG. 2. In this case, the portions around the recesses 147a in the release lever 131 are temporarily supported on the flange 115c of the fastener 115 via the lock protrusions 147e. Accordingly, the workability in assembly is improved.

In the first embodiment, the lock protrusions 147e are formed by cutting and raising the portions of the side walls 147 being part of the release lever 131. Accordingly, the lock protrusions 147e can be easily formed.

The front elastic deformation portion 141 of the lock member 117 in the first embodiment engages with the coupling portion 169 of the operation handle 133 at the position in front of the operation portion 159 of the release lever 131 with the movement relative to the coupling portion 169 in the front-rear direction restricted. The operation handle 133 is biased upward by the front elastic deformation portion 141 and the gap is thereby formed between the operation handle 133 and the front lower guide projections 147i.

In this configuration, when the operation handle 133 is operated to turn upward in the lock release direction, the operation handle 133 promptly turns from the state in contact with the front upper guide projections 147g. Accordingly, the lock release work is smoothly performed. In this case, since the operation handle 133 is restricting in coming-off from the release lever 131 in the longitudinal direction, the operability in lock release is improved.

In the first embodiment, the front end of the front elastic deformation portion 141 in the lock member 117 includes the front end claw 145 protruding upward at the position in front of the operation portion 159 of the release lever 131 and the coupling portion 169 of the operation handle 133 includes the fitting recess 133a opened to a lower side. The operation handle 133 is biased upward by the front elastic deformation portion 141 in a state where the front end claw 145 is fitted to the fitting recess 133a from below.

Accordingly, the operation handle 133 and the release lever 131 are more surely coupled to each other and the operability in lock release is improved. Moreover, the front elastic deformation portion 141 including the front end claw 145 of the lock member 117 protruding forward beyond the release lever 131 is arranged below the coupling portion 169 of the operation handle 133. The upper portion of the front elastic deformation portion 141 including the front end claw 145 is thereby covered with the coupling portion 169. Accordingly, when the operator looks down, the front elastic deformation portion 141 including the front end claw 145 is hidden by the coupling portion 169 of the operation handle 133 and the operator can operate the operation handle 133 with sense of security.

In the first embodiment, the operation handle 133 includes the flanges 169b3 protruding outward toward the left and right sides from the lower ends of the side surfaces 169b2 forming the fitting recess 133a of the operation handle 133, and the gaps between the upper guide projections 147g, 147j and the lower guide projections 147i, 147k in the up-down direction are formed such that the gap S1 in the up-down direction in the front side of the release lever 131 is greater than the gap S2 in the up-down direction in the rear side of the release lever 131. The flanges 169b3 of the operation handle 133 are inserted between the upper guide projections 147g, 147j and the lower guide projections 147i, 147k and the operation handle 133 is thus supported to be swingable in the up-down direction relative to the release lever 131. Moreover, the operation handle 133 is biased and supported such that the flanges 169b3 are brought into contact with the front upper guide projections 147g from below by the front elastic deformation portion 141.

In this configuration, when the operation handle 133 is operated and turned upward in the lock release direction, the operation handle 133 promptly turns from the state where the flanges 169b3 of the operation handle 133 are in contact with the front upper guide projections 147g. Accordingly, the lock release work is smoothly performed.

The gap S1 on the front side being larger than the gap S2 on the rear side facilitates the work of inserting the coupling portion 169 of the operation handle 133 between the upper guide projections 147g, 147j and the lower guide projections 147i, 147k and improves the assemblability. Moreover, this design facilitates upward and downward swinging of the operation handle 133 and improves the operability. Furthermore, the gap S2 on the rear side being smaller than the gap S1 on the front side stabilizes the position of the coupling portion 169 which is the fulcrum of the swinging of the operation handle 133 relative to the release lever 131 and improves the operability.

In the lock member 117 in the first embodiment, the fixation portion 119 and the front elastic deformation portion 141 are connected to each other by the front tilted portion 135 in the side view and extend in the front-rear direction. In the state where the fixation portion 119 and the front elastic deformation portion 141 are substantially parallel to each other which is illustrated in FIG. 2, the front elastic deformation portion 141 and the rear elastic deformation portion 123 are elastically deformed and the front end claw 145 and the rear end 125 are biased upward by this elastic deformation.

Accordingly, the lock member 117 can be formed only by bending a plate spring member with a flat-plate shape. The lock member 117 can thereby have a simple structure and be manufactured easily.

In the first embodiment, the front end of the front elastic deformation portion 141 in the lock member 117 includes the front end claw 145 protruding upward at the position in front of the operation portion 159 of the release lever 131 and the fitting recess 133*a* to which the front end claw 145 of the front elastic deformation portion 141 is fitted is formed in the lower portion of the operation handle 133.

Since the front end claw 145 of the front elastic deformation portion 141 is fitted to the fitting recess 133*a* of the operation handle 133 at the position in front of the operation portion 159 of the release lever 131 as described above, the movement of the operation handle 133 in the axial direction (front-rear direction) can be restricted. This can prevent force of the operation handle 133 in the axial direction from acting directly on the release lever 131 and restrict the movement of the release lever 131 in the axial direction. Moreover, when the operation handle 133 receives the upward biasing force from the front elastic deformation portion 141, the distal end of the coupling portion 169 is biased downward with the front upper guide projections 147*g* of the release lever 131 acting as a fulcrum. In this case, in the release lever 131, the front upper guide projections 147*g* are biased upward by the flanges 169*b*3 of the operation handle 133. Accordingly, the release lever 131 is held in the state where the recesses 147*a* and the protrusions 119*b* in the swing fulcrum portion 151 are engaged with one another, and there is maintained the state where the distal end of the coupling portion 169 in the operation handle 133 is pushed against the rear lower guide projections 147*k*.

Moreover, the front elastic deformation portion 141 of the lock member 117 extends parallel to the recess 170 of the operation handle 133 and, when the operation handle 133 is operated upward, the front elastic deformation portion 141 biasing the operation handle 133 moves together with the operation handle 133. In this case, the front end claw 145 and the front elastic deformation portion 141 are at positions overlapping the operation handle 133 in the up-down direction and do not protrude outward in the left-right direction. Accordingly, high safety can be achieved.

In the first embodiment, the front end claw 145 of the front elastic deformation portion 141 in the lock member 117 is located front of the front end of the upper rail 105. Accordingly, when the operation handle 133 is to be assembled to the release lever 131, it is possible to easily push down the front elastic deformation portion 141 protruding forward and, in this state, easily insert the operation handle 133 into the release lever 131.

In the first embodiment, when the grip 168 in the front portion of the operation handle 133 receives downward load, the operation handle 133 swings counterclockwise in FIG. 2 with the front lower guide projections 147*i* acting as a fulcrum while causing the front elastic deformation portion 141 to warp. In this case, the flanges 169*b*3 at the rear end of the coupling portion 169 move upward, away from the rear lower guide projections 147*k*.

In the operation handle 133, the flanges 169*b*3 thereby come into contact with the rear upper guide projections 147*j* from below and more-than-necessary swinging of the operation handle 133 can be prevented. The effect of preventing the more-than-necessary swinging of the operation handle 133 as described above is effective in the state where the upper rail 105 protrudes forward beyond the lower rail 103.

The swing fulcrum portion 151 in the first embodiment can be set substantially within the thickness of the lock member 117 formed of the plate spring. Thus, the swing fulcrum structure can be formed in a compact manner.

When the release lever 131 receives impact and moves rearward, the recesses 147*a* disengage from the protrusions 119*b*. In this case, the recesses 147*a* and the protrusions 119*b* only slightly plastically deform while the release lever 131 moves downward by an amount corresponding to a gap T illustrated in FIG. 10. Accordingly, force to turn the release lever 131 in the lock release direction is very small. Thus, it is possible to prevent the release lever 131 from pushing the lock member 117 downward and more surely prevent the lock release when the recesses 147*a* disengage from the protrusions 119*b*.

Load at which the recesses 147*a* disengage from the protrusions 119*b* can be easily set by changing the shape of the recesses 147*a* or the protrusions 119*b*. For example, the lower portions of the protrusions 119*b* may be formed in a curved shape protruding downward to match the curved shape of the recesses 147*a*. The recesses 147*a* may have such a shape that a bottom thereof has a flat shape and tilted surfaces are provided in front of and behind the flat-shaped bottom.

Note that, when the recesses 147*a* are to disengage from the protrusions 119*b*, the release lever 131 moves downward and the lock protrusions 147*e* come into contact with the flange 115*c* of the fastener 115. Rearward load received by the release lever 131 in this case is very large. Accordingly, the recesses 147*a* disengage from the protrusions 119*b* due to, for example, deformation of the lock protrusions 147*e*.

Second Embodiment

Figure 19:
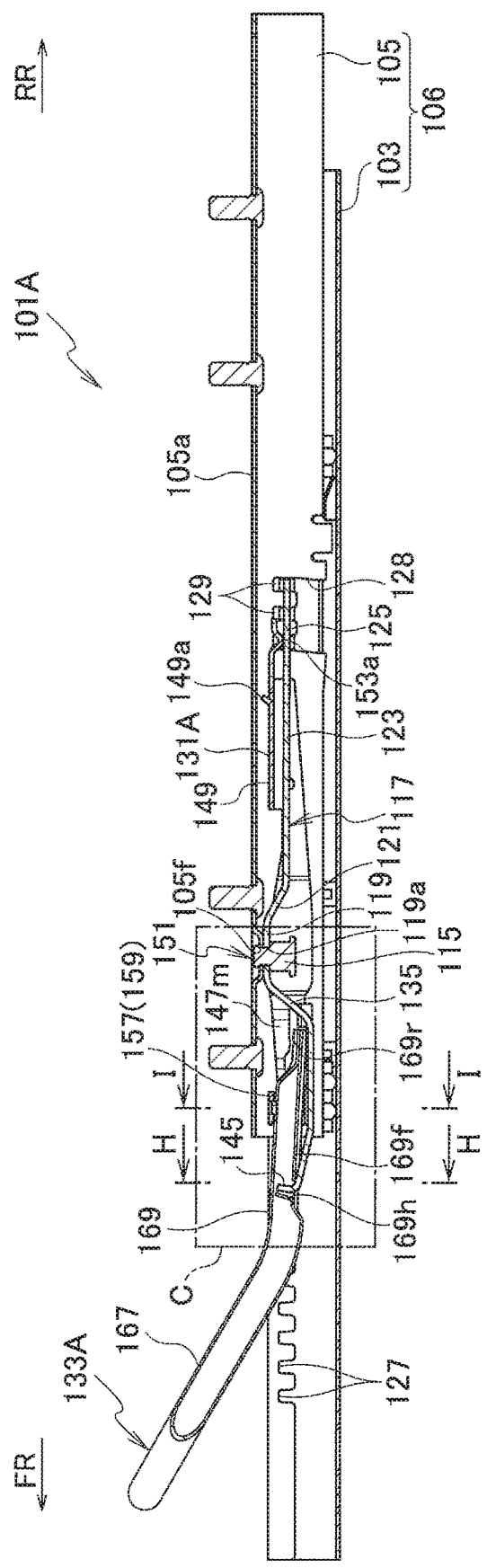
FIG. 19 is a side cross-sectional view of a seat slide device according to the second embodiment which corresponds to FIG. 2.

FIG. 19 is a side cross-sectional view of a seat slide device 101A according to a second embodiment which corresponds to FIG. 2. The second embodiment is different from the first embodiment in some portions of the release lever 131 and some portions of the operation handle 133. The lower rail 103 and the upper rail 105 in the second embodiment are the same as those in the first embodiment.

Figure 21A:
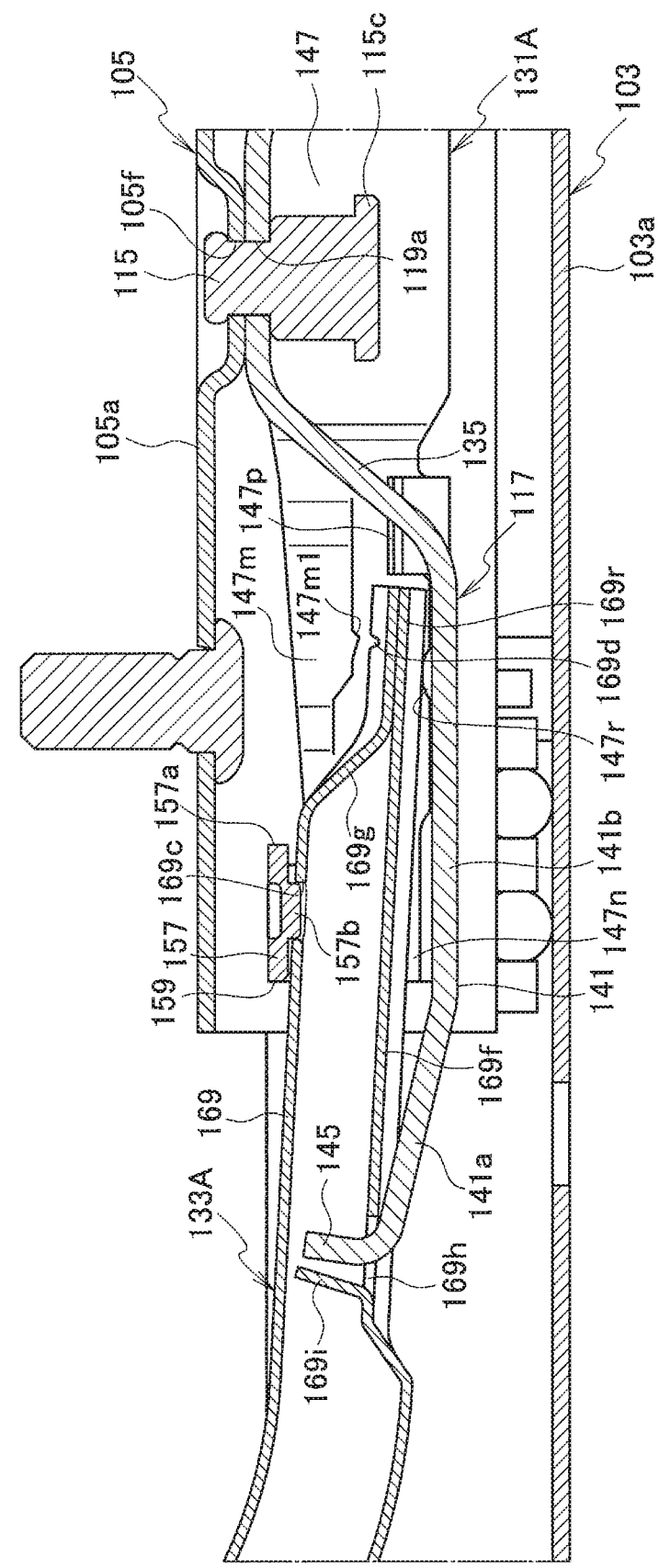
FIG. 21A is an enlarged view of the portion C in FIG. 19.

The lock member 117 in the second embodiment has substantially the same basic shape as that in the first embodiment. However, as illustrated in FIGS. 19 and 21A, a tilted portion 141*a* is formed in a portion of the front elastic deformation portion 141 on the front end claw 145 side. A portion on the front tilted portion 135 side of the tilted portion 141*a* is a flat surface 141*b*. The tilted portion 141*a* is tilted such that a portion of the tilted portion 141*a* on the front end claw 145 side is located above a portion of the tilted portion 141*a* on the flat surface 141*b* side.

Next, a release lever 131A is described. FIGS. 24 to 27 illustrate the release lever 131A in the second embodiment. The release lever 131A is different from the release lever 131 in the first embodiment in the shape of the front portion including the operation portion 159.

Figure 20A:
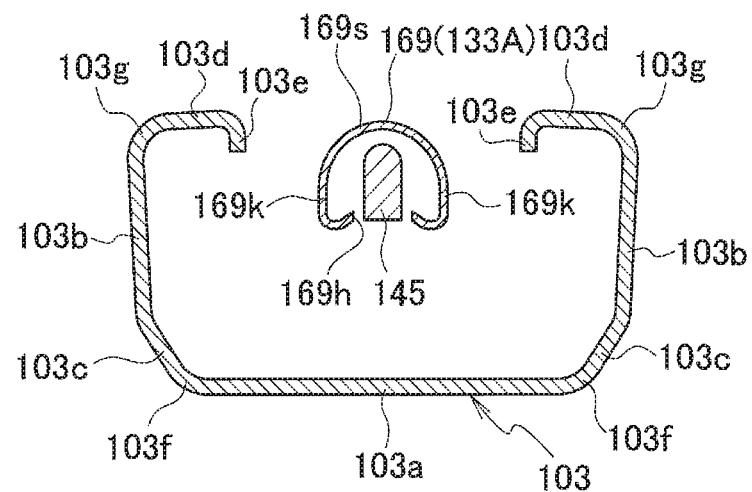
FIG. 20A is a cross-sectional view along the line H-H in FIG. 19.
Figure 20B:
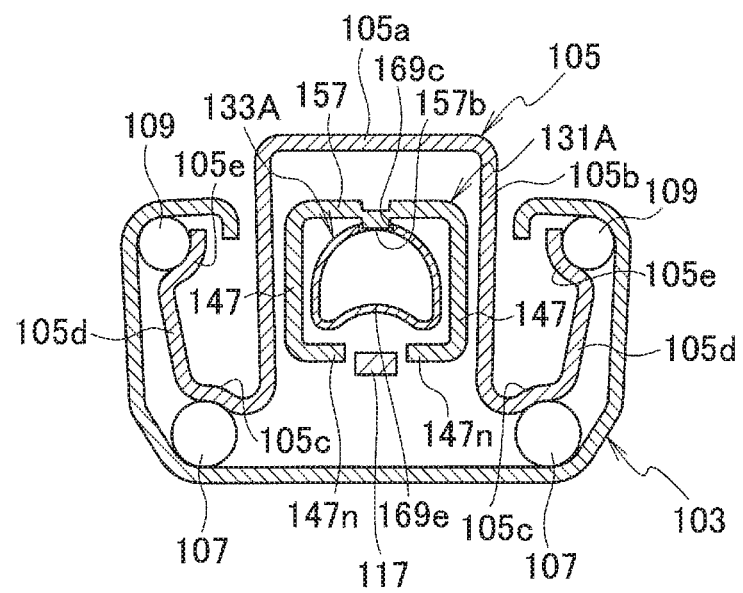
FIG. 20B is a cross-sectional view along the line I-I in FIG. 19.

In the front upper wall 157 of the operation portion 159, an arc-shaped protrusion 157*a* protruding rearward in an arc shape is formed. The area of the front upper wall 157 in the plan view is increased from that in the first embodiment by the arc-shaped protrusion 157*a*. As illustrated in FIG. 20B, an engagement projection 157*b* protruding downward is formed at the center of the front upper wall 157. The engagement projection 157*b* has, for example, an ellipsoid shape elongated in the front-rear direction and can be formed by embossing.

The engagement projection 157*b* engages with a later-described engagement hole 169*c* formed on an upper surface of the operation handle 133A. The front elastic deformation portion 141 of the lock member 117 biases the operation handle 133A upward and this causes the engagement hole 169*c* to engage with the engagement projection 157*b*. Specifically, an engagement portion formed of the engagement projection 157*b* and the engagement hole 169*c* which engage with each other when the front elastic deformation portion 141 biases the operation handle 133A upward is provided in the operation portion 159 of the release lever 131A and the coupling portion 169 at a position corresponding to a curved recess 169e of the operation handle 133A.

Paired protrusion-shaped portions 147m protruding toward each other are formed in the upper portions of the side walls 147 behind the operation portion 159. The paired protrusion-shaped portions 147m are formed by causing the upper ends or the side walls 147 to protrude in a bridge shape along the longitudinal direction and are formed to elongate in the front-rear direction like the rear upper guide projections 147j in the first embodiment. A gap between the paired protrusion-shaped portions 147m is smaller than the gap between the paired rear upper guide projections 147j. The distal end of the coupling portion 169 in the operation handle 133A is arranged below the paired protrusion-shaped portions 147m.

Lock claws 147m1 which are lock projections are formed in lower ends of the paired protrusion-shaped portions 147m. The lock claws 147m1 protrude downward from lower end surfaces of the protrusion-shaped portions 147m at substantially the center positions of the protrusion-shaped portions 147m in the front-rear direction. Moreover, as illustrated in FIG. 21A, substantially V-shaped lock grooves 169d are formed on an upper surface of the distal end of the operation handle 133A.

The lock grooves 169d are locked to the lock claws 147m1 when the operation handle 133A is pushed downward opposite to the lock release direction and, with this pushing, the distal end of the coupling portion 169 is moved upward. Specifically, a lock portion formed of the lock claws 147m1 and the lock grooves 169d which are locked to one another when the operation handle 133A is pushed downward and, with this pushing, the distal end of the coupling portion 169 is moved upward is provided in the protrusion-shaped portions 147m of the release lever 131A and a portion of the operation handle 133A formed to have a substantially M-shaped cross section.

Figure 25:
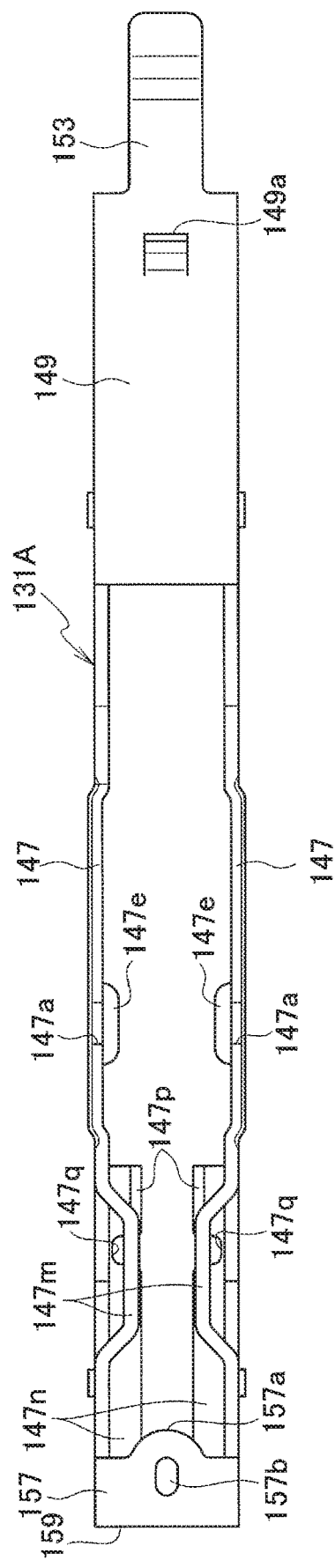
FIG. 25 is a plan view of the release lever in FIG. 24.

Lower flanges 147n bent from lower end edges of the left and right side walls 147 toward each other are formed in ends of the left and right side walls 147 on the operation portion 159 side. As illustrated in FIG. 25, a protruding amount of the paired lower flanges 147n toward each other is substantially the same as a protruding amount of the paired protrusion-shaped portions 147m toward each other.

The lower flanges 147n are formed in a region from a front end of the release lever 131A to a position behind the protrusion-shaped portions 147m. Stoppers 147p bent upward are formed in rear ends of the lower flanges 147n. The stoppers 147p are located near rear ends of the protrusion-shaped portions 147m. Notch recesses 147q recessed toward the side walls 147 are formed in the lower flanges 147n, in front of the stoppers 147p.

Figure 27:
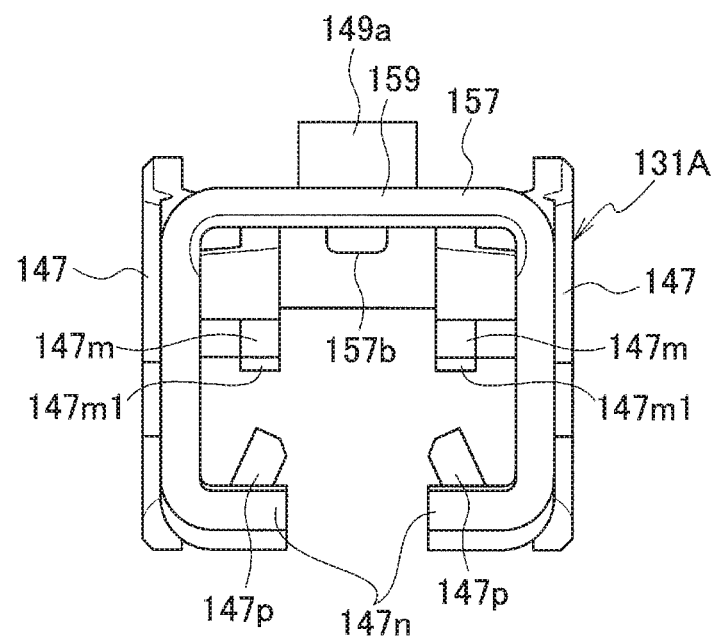
FIG. 27 is a front view of the release lever in FIG. 24 as viewed from the front side.

As illustrated in FIG. 27, the stoppers 147p are tilted such that upper ends thereof are located closer to the center in the left-right direction than lower ends thereof are. The stoppers 147p face the rear end of the operation handle 133A and, when the operation handle 133A moves rearward relative to the release lever 131A, come into contact with the rear end of the operation handle 133A. The stoppers 147p replace the protrusions 147c in the first embodiment.

Figure 26:
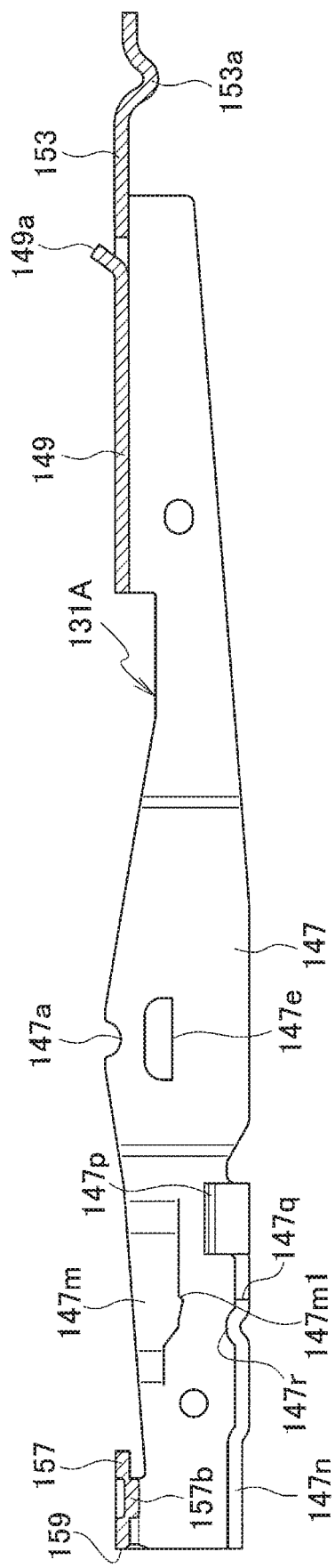
FIG. 26 is a side cross-sectional view of the release lever in FIG. 24.

As illustrated in FIG. 26, arc-shaped projections 147r which are contact portions are formed in the lower flanges 147n on the opposite side to the stoppers 147p across the notch recesses 147q. The arc-shaped projections 147r protrude upward such that upper surfaces thereof are formed in an arc shape in the front rear direction. As illustrated in FIG. 21A, a lower surface of a portion of the operation handle 133A on the coupling portion 169 side comes into contact with the arc-shaped projections 147r from above. The arc-shaped projections 147r only need to be formed at at least positions where the coupling portion 169 comes into contact with the lower flanges 147n but may be formed over the entire regions of the lower flanges 147n in the left-right direction.

Next, the operation handle 133A is described. FIG. 28 to FIG. 30B illustrate the operation handle 133A in the second embodiment. The operation handle 133A is different from the operation handle 133 of the first embodiment in the shape around the coupling portion 169.

The coupling portion 169 has a shape of the cylindrical portion crushed from above and below as in the first embodiment. The crushed shape of the coupling portion 169 in a front portion 169f on the arm 167 side is different from that in a rear portion 169r on the distal end side (rear side) which is the opposite side to the arm 167 across the front portion 169f.

Figure 30A:
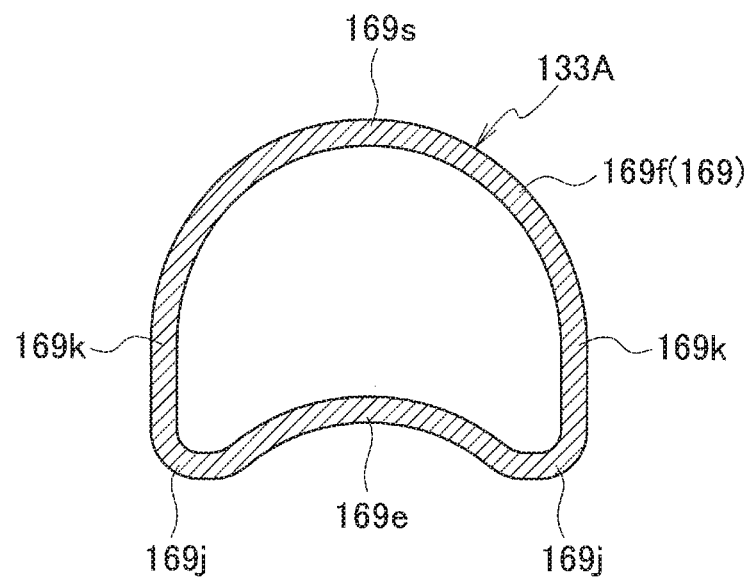
FIG. 30A is a cross-sectional views along the line K-K in FIG. 28.
Figure 30B:
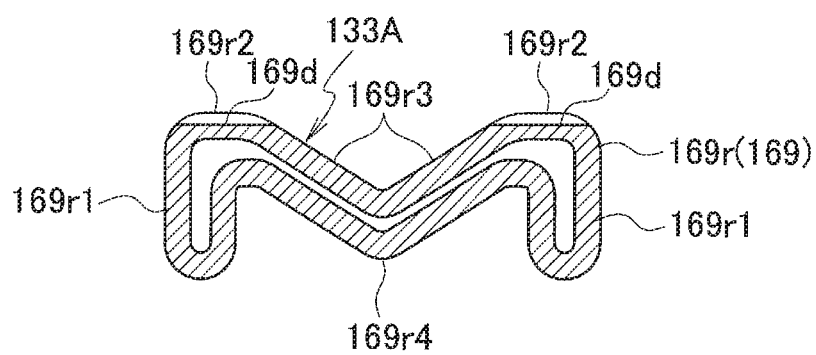
FIG. 30B is a cross-sectional view along the line N-N in FIG. 28.

As illustrated in FIG. 30A, the front portion 169f has a curved recess 169e in which a lower surface is recessed upward in a curved shape. Left and right ends of the curved recess 169e are connected to lower ends of side walls 169k via curved bent portions 169j. Upper ends of the side walls 169k are connected to an arc-shaped portion 169s in an upper surface. The aforementioned engagement hole 169c is formed at the center of the arc-shaped portion 169s in the left-right direction at a position close to the rear portion 169r. As illustrated in FIG. 30B, the rear portion 169r has a substantially cross section. Processing of the M-shaped portion is performed, for example, after the entire coupling portion 169 is processed to have the curved recess 169e as in the front portion 169f.

Figure 28:
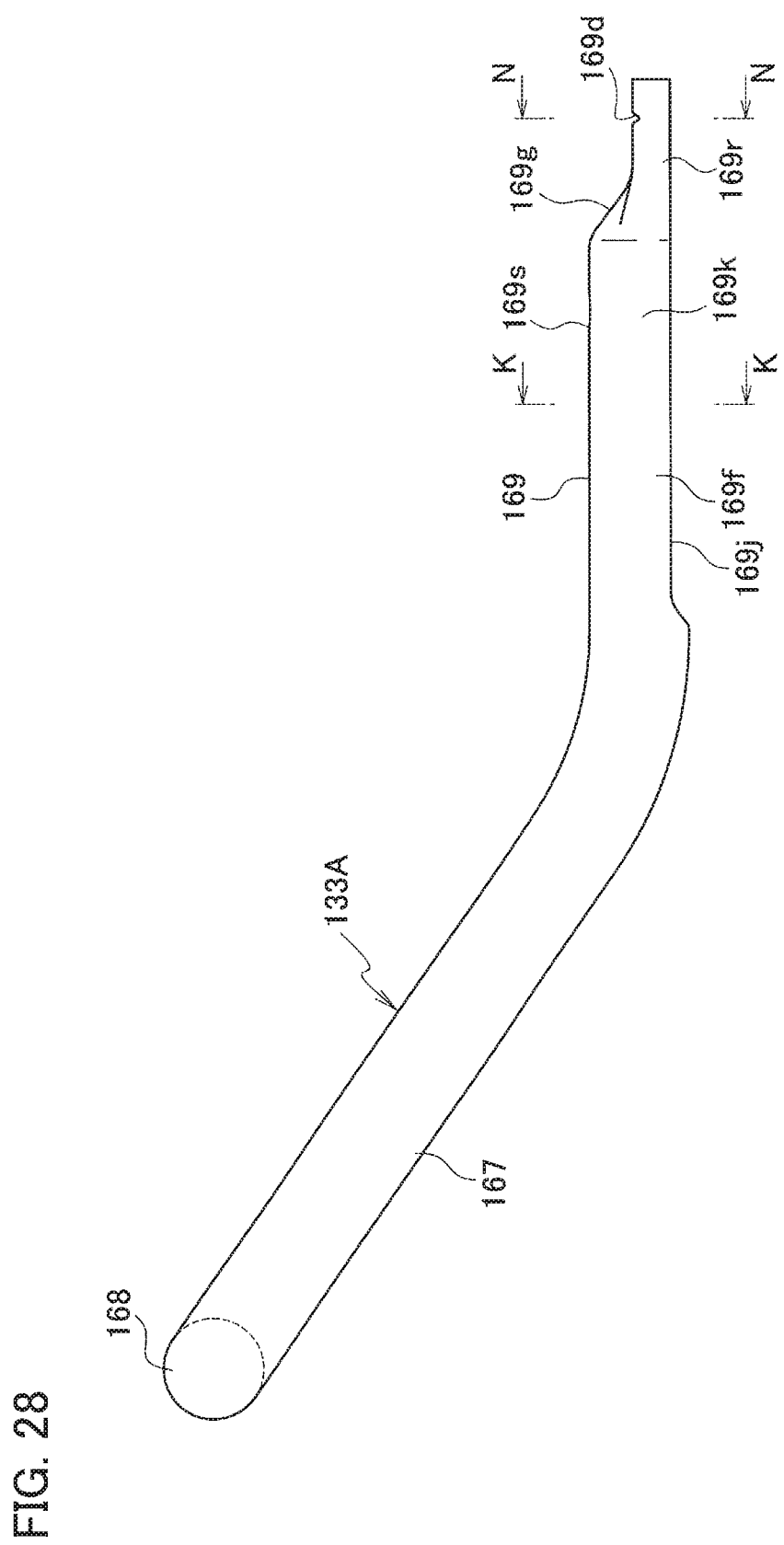
FIG. 28 is a side view of the operation handle according to the second embodiment.
Figure 29:
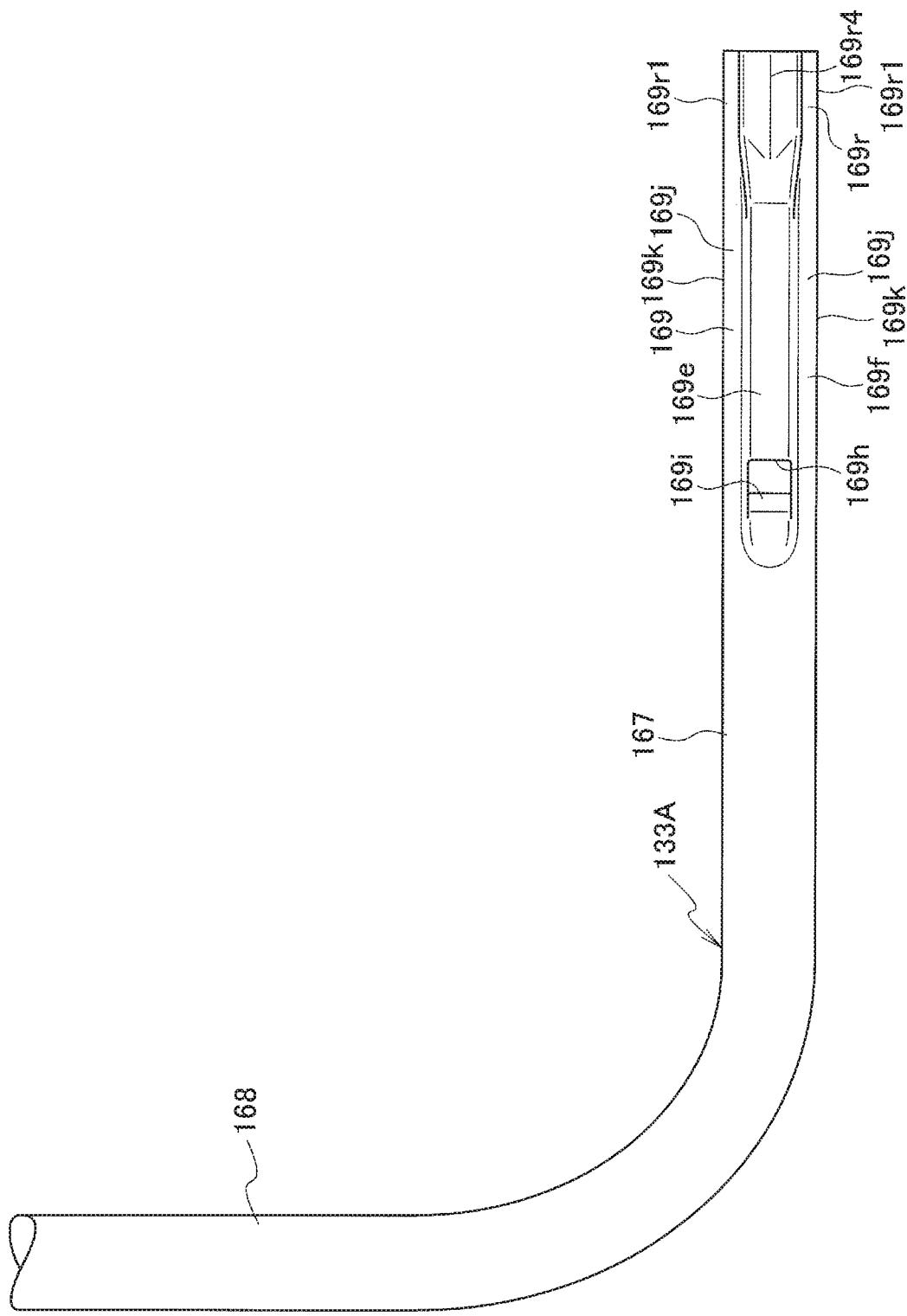
FIG. 29 is a bottom view illustrating part of the operation handle in FIG. 28.

As illustrated in FIG. 28, the lower surface of the front portion 169f and a lower surface of the rear portion 169r are substantially flush and an upper surface of the rear portion 169r is located below the upper surface of the front portion 169f in the up-down direction. An upper surface of a portion between the front portion 169f and the rear portion 169r is tilted as a tilted portion 169g. As illustrated in FIG. 29, the width of the front portion 169f is substantially the same as the width of the rear portion 169r.

As illustrated in FIG. 30B, the substantially M-shaped portion of the rear portion 169r includes paired vertical walls 169r1 extending in the up-down direction at positions on left and right sides, horizontal walls 169r2 extending from upper ends of the paired vertical walls 169r1 toward each other, and tilted walls 169r3 extending obliquely downward from ends of the horizontal walls 169r2 on the opposite sides to the vertical walls 169r1 toward each other.

The paired left and right tilted walls 169r3 are connected to each other at a connecting portion 169r4 at a lower end. A lower end of the connecting portion 169r4 is located above lower ends of the vertical walls 169r1 in the up-down direction. Note that the vertical walls 169r1, the horizontal walls 169r2, the tilted walls 169r3, and the connecting portion 169r4 each include both of an outer portion (upper portion) and an inner portion (lower portion) in the state where the cylindrical member is crushed from above and below. The outer portion (upper portion) and the inner portion (lower portion) are not in tight contact with each other and a gap is formed therebetween.

As illustrated in FIG. 21A, a through hole 169h into which the front end claw 145 of the lock member 117 is inserted is formed in a lower portion of the front portion 169f near the front end thereof. The lock member 117 pushes the operation handle 133A upward with the front elastic deformation portion 141 in the state where the front end claw 145 is inserted in the through hole 169h. A bent piece 169i bent inward is formed in a front end of the through hole 169h. The bent piece 169i and the front end claw 145 face each other in the front-rear direction.

In this state, in the operation handle 133A, the upper surface of the front portion 169f is pushed against the lower surface of the front upper wall 157 (operation portion 159) from below with the engagement hole 169c engaging with the engagement projection 157b of the release lever 131A. Meanwhile, lower ends of the vertical walls 169r1 in the substantially M-shaped portion of the rear portion 169r come into contact with the arc-shaped projections 147r by being pushed from above. In this case, the paired protrusion-shaped portions 147m of the release lever 131A are located above the left and right horizontal walls 169r2 of the substantially M-shaped portion.

Figure 23:
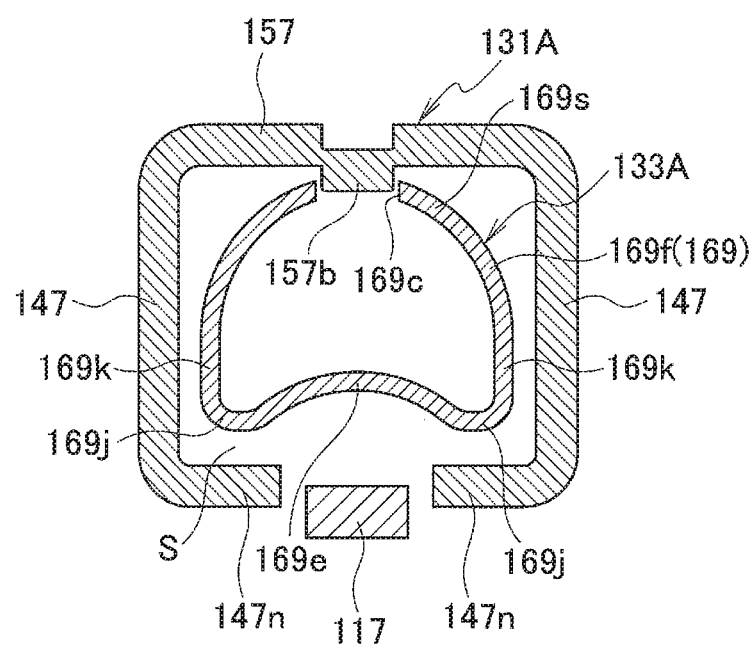
FIG. 23 is a cross-sectional view along the line J-J in FIG. 22.
Figure 24:
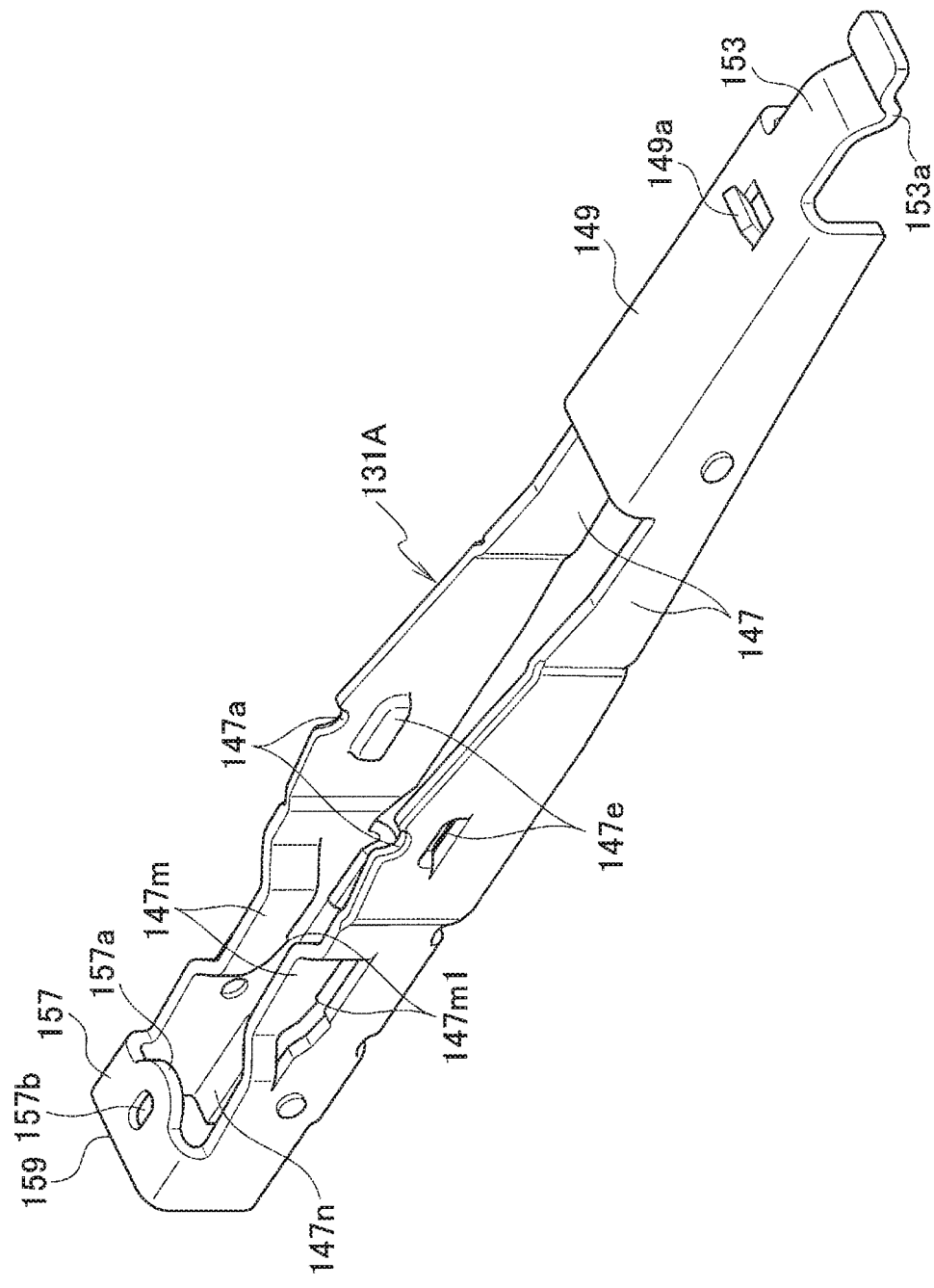
FIG. 24 is a perspective view of the release lever according to the second embodiment.

As illustrated in FIG. 23, in the state where the engagement hole 169c engages with the engagement projection 157b of the release lever 131A, the left and right side walls 169k of the front portion 169f are close to the left and right side walls 147 of the release lever 131A. In this case, lower ends of the front portion 169f (lower ends of the bent portions 169j) are spaced away from the lower flanges 147n of the release lever 131A and a gap S is formed.

Next, operations of the seat slide device 101A configured as described above are described.

Figure 22:
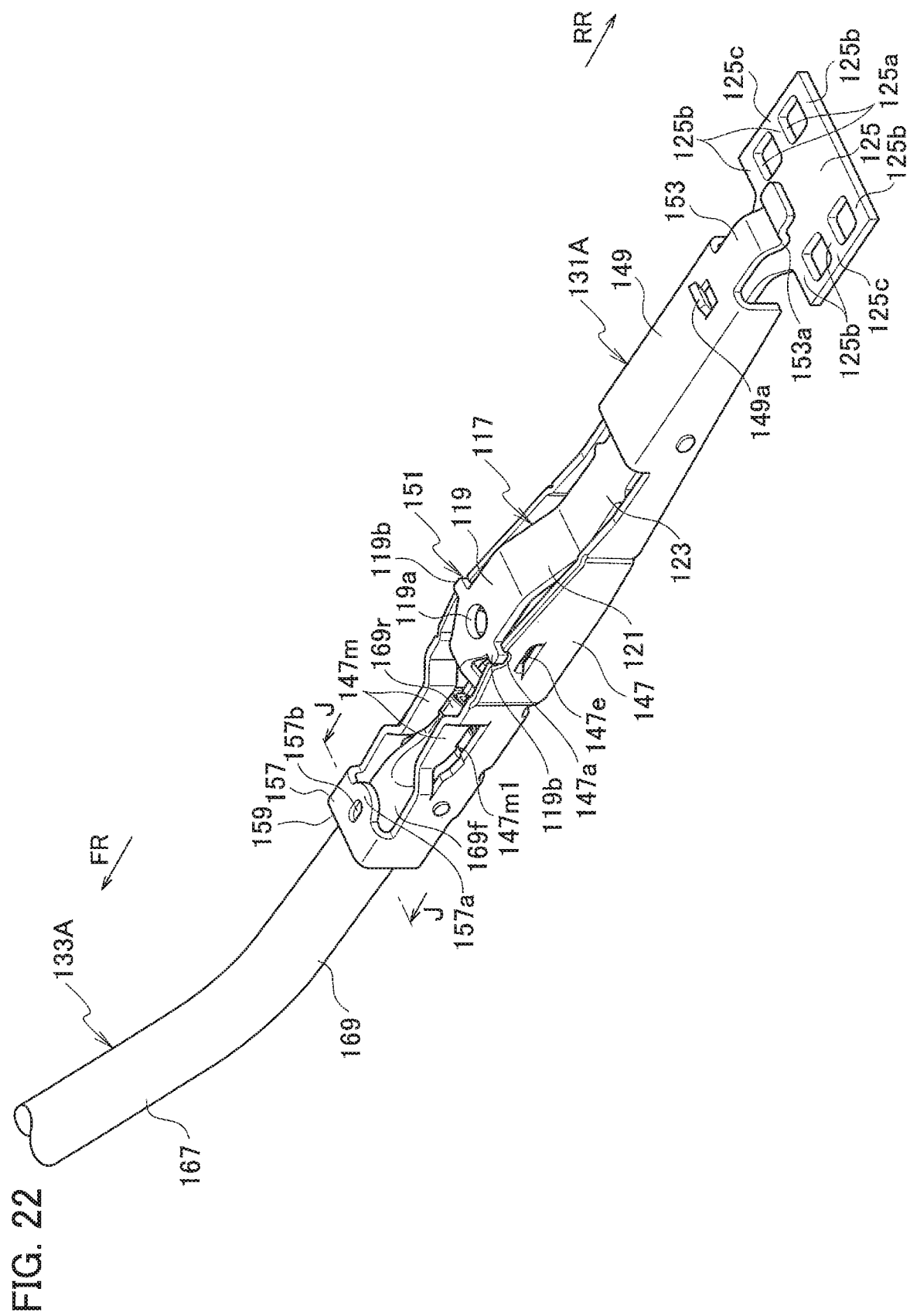
FIG. 22 is a perspective view illustrating a state where a release lever, a lock member, and an operation handle in a second embodiment are assembled.

FIG. 19 illustrates a lock maintained state in which the lock teeth 125b of the lock member 117 illustrated in FIG. 22 are locked by engaging with the lock grooves 127 of the lower rail 103. When the occupant operates the operation handle 133A upward in this state, in the operation handle 133A, the rear portion 169r of the coupling portion 169 pushes the arc-shaped projections 147r downward and the front portion 169f pushes the lower surface of the operation portion 159 upward. In this case, upward operation force of the operation handle 133A is transmitted to the release lever 131A via the operation portion 159.

The operation handle 133A thereby swings and turns clockwise in FIG. 19 about the swing fulcrum portion 151 integrally with the release lever 131A as in the first embodiment. In this case, in the release lever 131A, the curved protrusion 153a of the release pressing portion 153 pushes the rear end 125 of the lock member 117 downward and the lock is released.

When the occupant determines the seat position in the front-rear direction with the lock released and then releases his or her hand from the operation handle 133A, the rear elastic deformation portion 123 of the lock member 117 pushes the release pressing portion 153 upward to cause the release lever 131A to swing and turn and the seat slide device 101A returns to the lock maintained state in FIG. 19. In this case, the release lever 131A swings and turns counterclockwise in FIG. 19 about the swing fulcrum portion 151 together with the operation handle 133A.

For example, assume a case where the vehicle is hit from behind and the heel of the occupant moves rearward and hits the operation handle 133A in the state of FIG. 19. In this case, load received by the operation handle 133A sometime causes the front end claw 145 to disengage from the through hole 169h. Rearward movement of the operation handle 133A in this case causes the rear portion 169r to come into contact with the stoppers 147p of the release lever 131A and the rearward movement of the operation handle 133A relative to the release lever 131A is thereby restricted.

When the stoppers 147p receive the rearward load from the operation handle 133A, the recesses 147a in the swing fulcrum portion 151 disengage from the protrusions 119b of the lock member 117 and the release lever 131A moves rearward together with the operation handle 133A. This reduces impact received by the heel of the occupant when the heel hits the operation handle 133A as in the first embodiment.

Also in the second embodiment, the lock member 117 and the release lever 131A can be assembled into one unit before being assembled to the upper rail 105 as in the first embodiment. Accordingly, the workability in assembly can be improved.

As in the first embodiment, the operation handle 133A is configured such that the coupling portion 169 is inserted into the release lever 131A from the front end opening thereof while the front elastic deformation portion 141 of the lock member 117 is made to warp downward with the lock member 117 and the release lever 131A assembled to the upper rail 105. In this case, the front end claw 145 of the lock member 117 moves relative to the lower end of the connecting portion 169r4 in the substantially M-shaped portion and an inner surface of the curved recess 169e while sliding on the lower end and the inner surface or in a state close to the lower end and the inner surface.

The rear portion 169r (substantially M-shaped portion) of the coupling portion 169 is thereby inserted between the protrusion-shaped portions 147m and the lower flanges 147n and the front end claw 145 of the lock member 117 is inserted into the through hole 169h. As a result, a state where the assembly is completed as illustrated in FIGS. 19 and 21A is achieved. As described above, as in the first embodiment, the operation handle 133A only needs to be inserted into the release lever 131A with the front elastic deformation portion 141 of the lock member 117 warped downward and the workability in assembly of the operation handle 133A is improved.

In this case, as illustrated in FIG. 21A, the engagement projection 157b engages with the engagement hole 169c and the lock claws 147m1 are spaced away from the lock grooves 169d. A gap is formed between the rear end of the rear portion 169r and the stoppers 147p.

When the operation handle 133A is inserted into the release lever 131A, the rear portion 169r is inserted and then about substantially the half of the front portion 169f in the front-rear direction is inserted. In this case, as illustrated in FIG. 23, the gap S is formed between the lower flanges 147n of the release lever 131A and the coupling portion 169 (front portion 169f) of the operation handle 133A. Accordingly, work of inserting the coupling portion 169 into the release lever 131A is facilitated.

The lower flanges 147n are arranged below the operation portion 159 at the front end of the release lever 131A. In this configuration, when the portion around the grip 168 in the operation handle 133A is pushed downward, the operation handle 133A swings counterclockwise in FIGS. 19 and 21A with the front ends of the lower flanges 147n acting as a fulcrum while causing the front elastic deformation portion 141 to elastically deform and is set to the state in FIG. 21B. The gap S formed between the lower flanges 147n of the release lever 131A and the operation handle 133A as illustrated in FIG. 23 enables smooth counterclockwise swinging of the operation handle 133A.

Figure 21B:
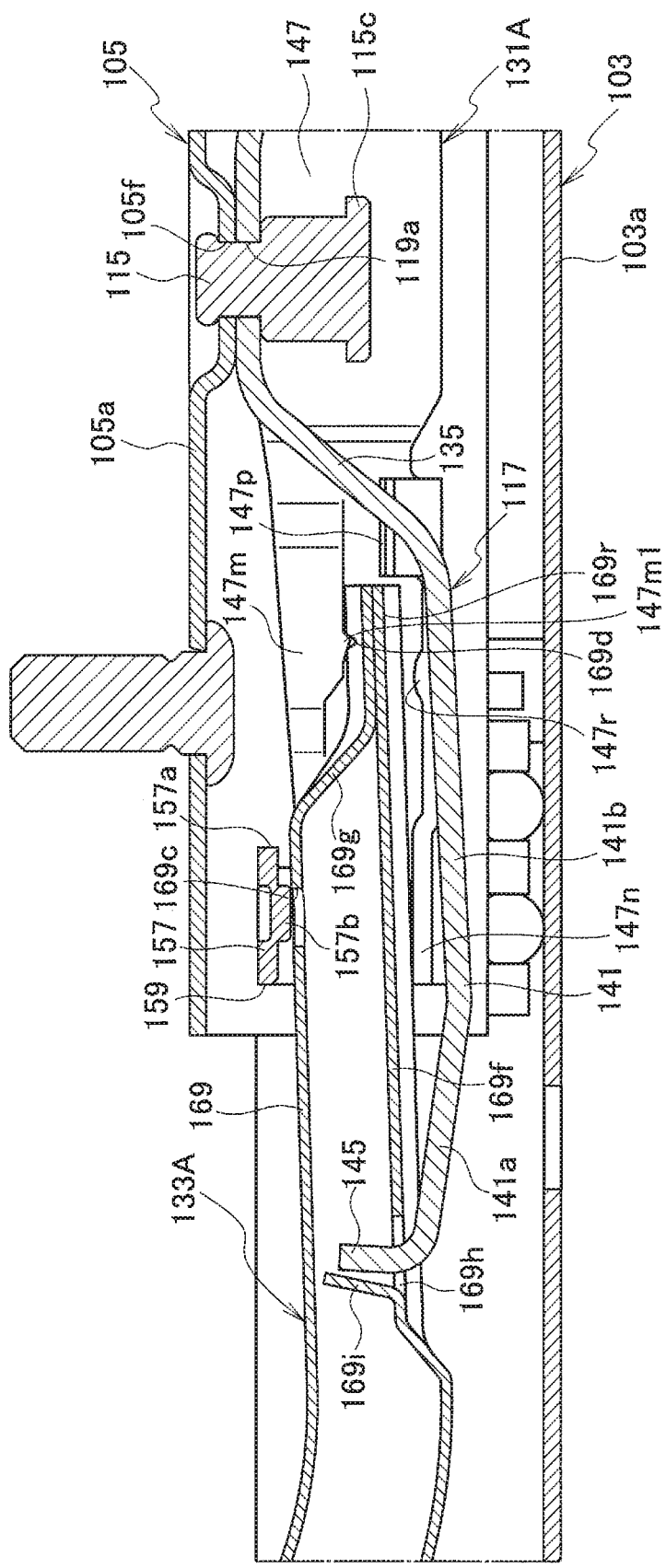
FIG. 21B is a view explaining an operation performed when the operation handle is pressed downward from the state in FIG. 21A.

When the engagement projection 157b disengages from the engagement hole 169c as illustrated in FIG. 21B in this case, the rear portion 169r of the coupling portion 169 moves upward. The upward movement of the rear portion 169r causes the lock claws 147m1 to be locked to the lock grooves 169d. The lock claws 147m1 are formed to prevent the operation handle 133A from moving forward and coming off from the release lever 131A by entering the lock grooves 169d.

Specifically, in the second embodiment, the release lever 131A includes the lock claws 147m1 protruding downward in the lower portions of the paired protrusion-shaped portions 147m. In the operation handle 133A, the upper surface of the portion with the substantially M-shaped cross section is provided with the lock grooves 169d to which the lock claws 147m1 are locked when the distal end of the coupling portion 169 moves upward with downward pressing of the operation handle 133A.

Accordingly, it is possible to prevent the operation handle 133A from moving forward and coming off from the release lever 131A when the operation handle 133A receives downward load, and the reliability is improved. Preventing the operation handle 133A from coming off can prevent load from acting on the lock member 117 in the front-rear direction. Moreover, the more-than-necessary downward movement of the grip 168 in the operation handle 133A can be restricted by bringing the upper surface of the substantially M-shaped rear portion 169r into contact with the lower end surfaces of the protrusion-shaped portions 147m.

In the release lever 131A in the second embodiment, the operation portion 159 includes the engagement projection 157b protruding downward. In the operation handle 133A, the engagement hole 169c configured to engage with the engagement projection 157b when the operation handle 133A is biased upward by the front elastic deformation portion 141 of the lock member 117 is provided at the position corresponding to the curved recess 169e on the upper surface of the coupling portion 169.

Accordingly, for example, when the operation handle 133A is operated, load acting on the operation handle 133A in the front-rear direction is transmitted to the release lever 131A via the engagement portion formed of the engagement projection 157b and the engagement hole 169c. In this case, the load of the operation handle 133A can be prevented from acting on the lock member 117 and the durability of the lock member 117 is improved. The improvement in the durability of the lock member 117 achieves effects such as further stabilization of the lock maintained state, further stabilization of the lock release operation, and the like and the reliability is improved.

The coupling portion 169 of the operation handle 133A in the second embodiment includes the curved recess 169e with the shape curved upward in the lower surface and the coupling portion 169 behind the curved recess 169e is formed to have the substantially M-shaped cross section whose upper ends are formed to be flat surfaces. Accordingly, the coupling portion 169 configured to transmit the operation force applied to the operation handle 133A to the release lever 131A has higher stiffness than the cylindrical arm 167 and the cylindrical grip 168 and is improved in durability.

For example, the rear portion 169r is subjected to pressing in the up-down direction to be formed into the substantially M-shape. This enables accurate manufacturing of the rear portion 169r which needs to be inserted between the protrusion-shaped portions 147m (lock claws 147m1) and the arc-shaped projections 147r of the release lever 131A.

The release lever 131A in the second embodiment includes: the lower flanges 147n which are located below the operation portion 159 and are bent from the lower ends of the left and right side walls 147 toward each other, and which come into with the operation handle 133A when the operation handle 133A is pushed downward; the arc-shaped projections 147r which are provided in the lower portion of the release lever 131A behind the operation portion 159, wherein when the front elastic deformation portion 141 biases the operation handle 133A upward, the lower portions of the portion with the substantially M-shaped cross section in the coupling portion 169 move downward and come into contact with the arc-shaped projections 147r; the paired protrusion-shaped portions 147m which protrude from the left and right side walls 147 toward each other and which are arranged such that the portion with the substantially M-shaped cross section is arranged between the protrusion-shaped portions 147m and the arc-shaped projections 147r; and the stoppers 147p which face the distal end of the portion with the substantially M-shaped cross section and with which the operation handle 133A comes into contact when the operation handle 133A is moved rearward relative to the release lever 131A.

In this configuration, when the operation handle 133A is operated in the lock release direction, the front portion 169f pushes the operation portion 159 upward while the rear portion 169r of the coupling portion 169 presses the arc-shaped projections 147r downward. The lock can be thereby easily released. Meanwhile, when the operation handle 133A is pushed downward opposite to the lock release direction, the operation handle 133A swings with the lower flanges 147n acting as a fulcrum and the rear portion 169r comes into contact with the lower ends of the protrusion-shaped portions 147m to prevent more-than-necessary swinging. When the operation handle 133A is pushed rearward and the front end claw 145 disengages from the through hole 169h, the rear portion 169r comes into contact with the stoppers 147p. Accordingly, the rearward movement of the operation handle 133A relative to the release lever 131A can be restricted.

In the second embodiment, the arc-shaped projections 147r and the stoppers 147p are integrally provided in the lower flanges 147n. Accordingly, the release lever 131A can have a simple structure and be manufactured easily.

The present invention is not limited to the aforementioned embodiments. For example, the front upper guide projections 147g, the rear upper guide projections 147j, the front lower guide projections 147i, and the rear lower guide projections 147k in the first embodiment are each formed by bending or cutting and raising the left and right side walls 147 of the release lever 131. However, these projections may be configured to be formed as members separate from the side walls 147 and attached to the side walls 147 by welding or the like. In this case, the configuration may be such that each front upper guide projection 147g and the corresponding rear upper guide projection 147j are formed as one member and each front lower guide projection 147i and the corresponding rear lower guide projection 147k are formed as one member.

Although the arc-shaped projections 147r and the stoppers 147p are provided integrally in the lower flanges 147n in the second embodiment, the arc-shaped projections 147r and the stoppers 147p may be provided independently on the left and right side walls 147, separately from the lower flanges 147n.

Although the engagement projection 157b is provided in the release lever 131A and the engagement hole 169c is provided in the operation handle 133A in the second embodiment, the configuration may be reversed such that the engagement hole is provided in the release lever 131A and the engagement projection is provided in the operation handle 133A. Moreover, although the lock claws 147m1 are provided in the release lever 131A and the lock grooves 169d are provided in the operation handle 133A in the second embodiment, the configuration may be reversed such that the lock grooves are provided in the release lever 131A and the lock claws are provided in the operation handle 133A.

Third Embodiment

A third embodiment of the present invention is described below with reference to FIGS. 1 to 18 and FIGS. 31 and 32. Since FIGS. 1 to 18 are the same as in the first embodiment, description thereof is omitted below and the description in the first embodiment is incorporated.

Figure 31:
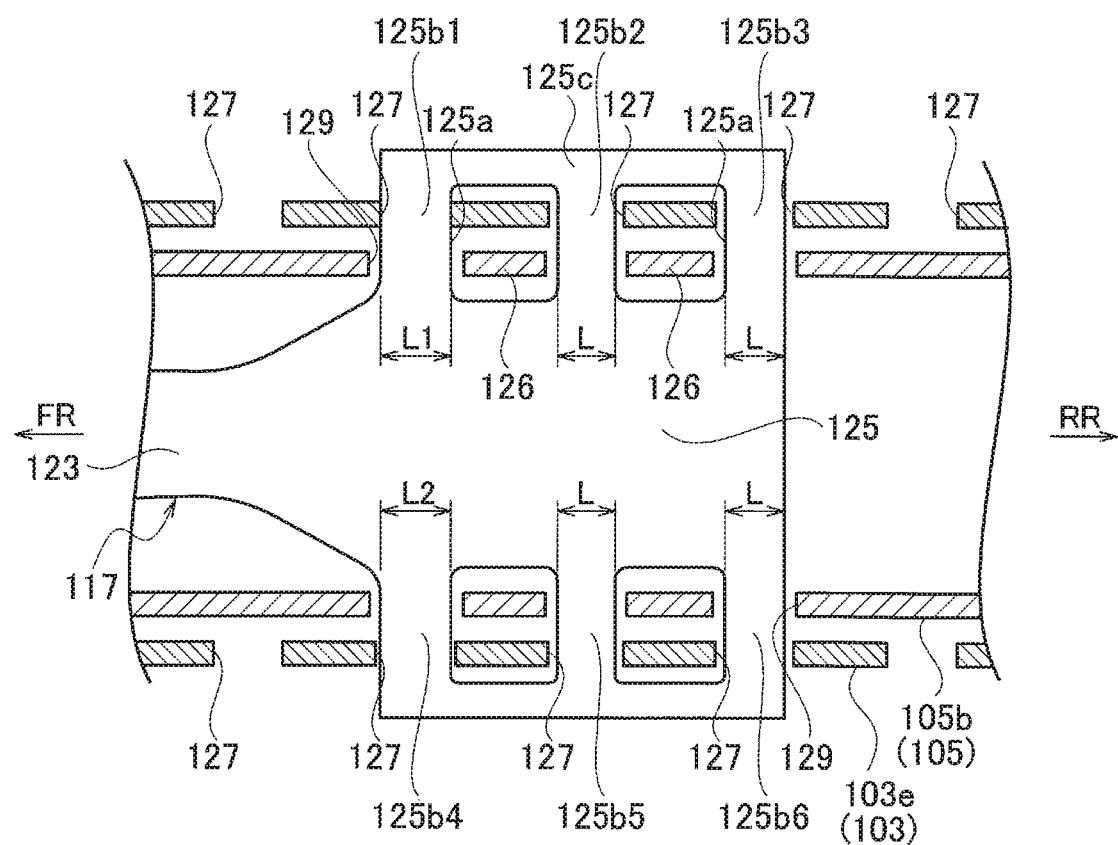
FIG. 31 is a plan view illustrating a state where lock teeth of a lock member according to a third embodiment are in engagement with lock grooves of the lower rail.
Figure 32:
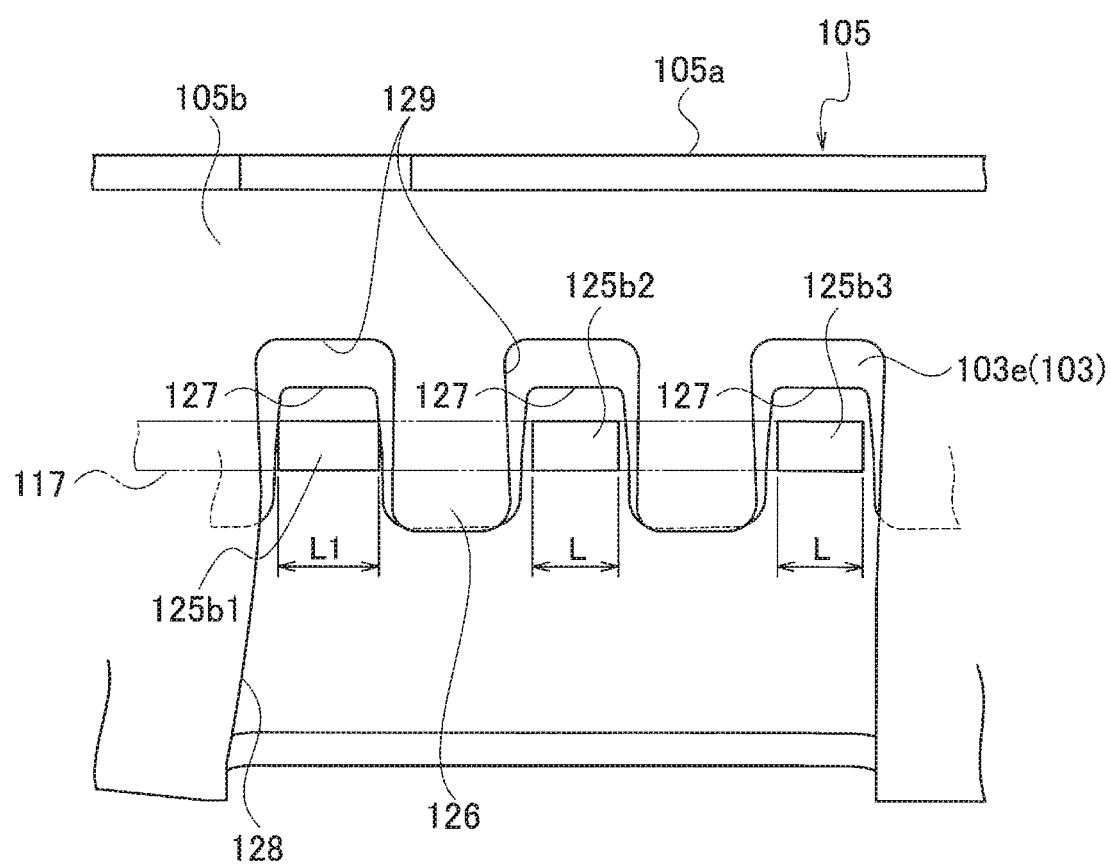
FIG. 32 is a side view of the engagement state in FIG. 31 as viewed from the inner side of a right upper-rail side wall of the upper rail.

FIG. 31 is a plan view illustrating a state where the lock teeth 125b of the lock member 117 are in engagement with the respective lock grooves 127. FIG. 32 is a side view of the engagement state in FIG. 31 as viewed from the inner side of the right upper-rail side wall 105b of the upper rail 105 and illustration of the lower-rail bottom wall 103a of the lower rail 103 is omitted. Note that, in FIGS. 31 and 32, the three lock teeth 125b on the right side (upper side in FIG. 31) are referred to as lock teeth 125b1, 125b2, 125b3 from the front side (left side in FIG. 31) and the three lock teeth 125b on the left side (lower side in FIG. 31) are referred to as lock teeth 125b4, 125b5, 125b6 from the front side (left side in FIG. 31).

In this configuration, the lock grooves 127 have the same width in the vehicle front-rear direction (left-right direction in FIG. 31. Same applies hereafter) in design. Meanwhile, the widths of the lock teeth 125b in the front-rear direction are such that the width of the right frontmost lock tooth 125b1 and the width of the left frontmost lock tooth 125b4 are greater than the width of the other four lock teeth 125b2, 125b3, 125b5, 125b6. Moreover, the width L1 of the lock tooth 125b1 is greater than the width L2 of the lock tooth 125b4 (L1>L2). Specifically, the width L1 of the lock tooth 125b1 is the largest and the width L2 of the lock tooth 125b4 is the second largest next to the width L1 of the lock tooth 125b1. The other four lock teeth 125b2, 125b3, 125b5, 125b6 have the same width L in the front-rear direction and the width L is smaller than the width L2 (L1>L2>L).

In the aforementioned configuration, front and rear ends of the lock tooth 125b1 come into contact with front and rear ends of the lock groove 127 and there are no gaps in the front-rear direction between the lock tooth 125b1 and the lock groove 127. Small gaps in the front-rear direction are formed between the lock tooth 125b4 and the lock groove 127. Gaps in the front-rear direction formed between the other four lock teeth 125b2, 125b3, 125b5, 125b6 and the lock grooves 127 are larger than the gaps in the front-rear direction formed between the lock tooth 125b4 and the lock groove 127.

In the third embodiment, the seat slide device includes: the lower rail 103 extending in the vehicle front-rear direction; the upper rail 105 configured to move relative to the lower rail 103 in the longitudinal direction thereof; and the lock member 117 attached to the upper rail 105 to be swingable in the front-rear direction abort the swing fulcrum portion 151 and including the lock teeth 125b configured to engage with the lock grooves 127 formed in the lower rail 103 and to be biased in the lock direction. The multiple lock grooves 127 are provided on each of the left and right portions of the lower rail 103 to be aligned in the vehicle front-rear direction. The multiple lock teeth 125b are provided on each of the left and right portions of the lock member 117 to be aligned in the vehicle front-rear direction.

There are no gaps in the vehicle front-rear direction between the right lock teeth 125b1 closest to the swing fulcrum portion 151 among the multiple lock teeth 125b and the lock groove 127 engaging with the lock teeth 125b1. The gaps smaller than the gaps formed between the lock teeth 125b2, 125b3, 125b5, 125b6 and the lock grooves 127 engaging with these lock teeth 125b2, 125b3, 125b5, 125b6 are formed in the vehicle front-rear direction between the left lock tooth 125b4 closest to the swing fulcrum portion 151 among the multiple lock teeth 125b and the lock groove 127 engaging with the lock tooth 125b4, the lock teeth 125b2, 125b3, 125b5, 125b6 being the multiple lock teeth 125b excluding the paired left and right lock teeth 125b1, 125b4 closest to the swing fulcrum portion 151. In other words, the gaps in the vehicle front-rear direction between the lock tooth 125b4 and the lock groove 127 are smaller than the gaps in the front-rear direction between the lock teeth 125b2, 125b3, 125b5, 125b6 and the lock grooves 127.

Note that, as illustrated in FIG. 32, the lock grooves 127 are each configured such that a width thereof in the front-rear direction in an upper portion is larger than that in a lower portion and the position where the lock teeth 125b1 and the lock groove 127 come into contact with each other is near the center position of the lock groove 127 in the up-down direction. The gaps in the front-rear direction between the other lock teeth 125b2 to 125b6 and the lock grooves 127 are formed near this center position.

In this configuration, normally, only the front and rear ends of the right frontmost lock tooth 125b1 come into contact with the lock groove 127 and no gaps are formed. Meanwhile, the front and rear ends of the other five lock teeth 125b2 to 125b6 do not come into contact with the lock grooves 127 and gaps are formed. This secures easy insertion of the lock teeth 125b into the lock grooves 127. Note that the gaps in the front rear direction between the lock teeth 125b and the lock grooves 127 are such that the gaps between the lock tooth 125b4 among the other five lock teeth 125b2 to 125b6 and the lock groove 127 are smaller than the gaps between the other four lock teeth 125b2, 125b3, 125b5, 125b6 and the lock grooves 127.

For example, assume a case where, in this state, the vehicle collides with something in the front-rear direction and the rail body 106 formed of the lower rail 103 and the upper rail 105 receives impact load in the front-rear direction. In this case, the lower rail 103 and the upper rail 105 receive force acting in such a direction that the lower rail 103 is shifted relative to the upper rail 105 in the front-rear direction. Then, the lower rail 103 (lock grooves 127) and the lock member 117 (lock teeth 125b) attached to the upper rail 105 also receive force acting in such a direction that the lower rail 103 is shifted relative to the lock member 117 in the front-rear direction.

In this case, since the right frontmost lock tooth 125b1 is in engagement with the lock groove 127 without gaps therebetween in the front-rear direction, the lock tooth 125b1 receives the aforementioned force first in the engagement portion. Then, the lock tooth 125b4 whose gaps with the lock groove 127 in the front-rear direction are smaller than the gaps between the other four lock teeth 125b2, 125b3, 125b5, 125b6 and the lock grooves 127 comes into contact with the lock groove 127 and receives the force.

As described above, in the third embodiment, when the rail body 106 receives impact load in the front-rear direction, the left and right frontmost lock teeth 125b1, 125b4 among the multiple lock teeth 125b aligned in the front-rear direction in the left and right portions come into contact with the lock grooves 127 before the other lock teeth 125*b*2, 125*b*3, 125*b*5, 125*b*6 behind the lock teeth 125*b*1, 125*b*4 do. In this case, the lock member 117 is supported with the left and right frontmost lock teeth 125*b*1, 125*b*4 pressed in the front-rear direction against the left and right lock grooves 127 in the lower rail 103. Accordingly, deformation due to twisting rotation about an axis in the front-rear direction can be suppressed.

Accordingly, it is possible to prevent twisting rotation of the lock member 117 caused by, for example, the right frontmost lock tooth 125*b*1 coming into contact with the lock groove 127 and then, in this state, the left rearmost lock tooth 125*b*6 subsequently coming into contact with the lock groove 127. Thus, deformation in such a direction that the lock tooth 125*b*4 disengages from the lock groove 127 can prevented. Lock strength between the lock member 117 and the lower rail 103 thereby becomes stable and is also improved.

In the third embodiment, the multiple lock grooves 127 formed to be aligned in the vehicle front-rear direction are arranged at substantially the same intervals in the vehicle front-rear direction in design, and the width L1, in the vehicle front-rear direction, of the right frontmost lock tooth 125*b*1 closest to the swing fulcrum portion 151 among the multiple lock teeth 125*b* is the largest and is larger than the widths L2, L of the other lock teeth 125*b*2 to 125*b*6 in the vehicle front-rear direction. The width L2, in the vehicle front-rear direction, of the left frontmost lock tooth 125*b*4 closest to the swing fulcrum portion 151 among the multiple lock teeth 125*b* is formed to be the second largest next to the width L1 of the lock tooth 125*b*1 in the vehicle front-rear direction.

In this case, for example, even when the dimensions of the lock teeth and the lock grooves vary by some extent in the manufacturing, the left and right frontmost lock teeth 125*b*1, 125*b*4 with the widths L1, L2 larger than the width L come into contact with the lock grooves 127 before the other lock teeth 125*b*2, 125*b*3, 125*b*5, 125*b*6 behind the lock teeth 125*b*1, 125*b*4 do. Accordingly, as described above, it is possible to prevent twisting rotation of the lock member 117 caused by, for example, the right frontmost lock tooth 125*b*1 coming into contact with the lock groove 127 and then, in this state, the left rearmost lock tooth 125*b*6 subsequently coming into contact with the lock groove 127. Thus, deformation in such a direction that the lock tooth 125*b*4 disengages from the lock groove 127 can be prevented.

In the third embodiment, the lock member 117 is formed of the plate spring and the multiple lock teeth 125*b* are formed integrally in the plate spring. In the lock member 117 formed of the plate spring, the aforementioned twisting rotation tends to occur due to elastic deformation. Accordingly, causing the left and right frontmost lock teeth 125*b*1, 125*b*4 to come into contact with the lock grooves 127 before the other lock teeth 125*b*2, 125*b*3, 125*b*5, 125*b*6 behind the lock teeth 125*b*1, 125*b*4 is very effective in suppressing the disengagement of the lock teeth 125*b* from the lock grooves 127.

Although the width L1 of the right frontmost lock tooth 125*b*1 is set to be the largest and the width L2 of the left frontmost lock tooth 125*b*4 is set to be the second largest next to the width L1, the configuration may be such that the width L2 of the left frontmost lock tooth 125*b*4 is set to be the largest and the width L1 of the right frontmost lock tooth 125*b*1 is set to be the second largest next to the width L2. In other words, the configuration may be such that the width of one of the left and right frontmost lock teeth 125*b*1, 125*b*4 in the front-rear direction is set to be the largest and the width of the other lock tooth in the front-rear direction is set to be the second largest.

In the third embodiment, the lock teeth 125*b* of the lock member 117 are connected to one another by the connecting portions 125*c* extending in the front-rear direction and the holes 125*a* are formed. However, the configuration may be such that the lock teeth are formed without the connecting portions 125*c* and recesses open on left and right outer sides are formed instead of the holes 125*a*. Although three lock teeth 125*b* are aligned in the front-rear direction in each of the left and right portions in the aforementioned embodiment, four or more lock teeth may be provided in each of the left and right portions.

Embodiments of the present invention have been described above. However, the invention may be embodied in other specific forms without departing from the spirit or essential characteristics thereof. The present embodiments are therefore to be considered is all respects as illustrative and not restrictive, the scope of the invention being indicated by the appended claims rather than by the foregoing description and all changes which come within the meaning and range of equivalency of the claims are therefore intended to be embraced therein.

Moreover, the effects described in the embodiments of the present invention are only a list of optimum effects achieved by the present invention. Hence, the effects of the present invention are not limited to those described in the embodiment of the present invention.

What is claimed is:

1. A seat slide device comprising:
   a lower rail extending in a vehicle front-rear direction and including a locked portion;
   an upper rail movable relative to the lower rail in a longitudinal direction of the lower rail;
   a lock member attached to the upper rail and including a lock portion biased in a lock direction in which the lock portion engages with the locked portion;
   a release lever arranged at a position overlapping the lock member in a longitudinal direction of the upper rail;
   an operation handle extending from a front side of the release lever in the vehicle front-rear direction and configured to operate the release lever in a lock release direction by moving integrally with the release lever with a swing fulcrum portion acting as a fulcrum in response to a lock release operation, wherein
   the release lever comprises:
      a release pressing portion capable of pressing a portion around the lock portion of the lock member to release an engagement of the lock portion with the locked portion;
      an operation portion located in the front side of the release lever and configured to be operated by the lock release operation of the operation handle; and
      the swing fulcrum portion provided between the release pressing portion and the operation portion, and
   the lock member is a plate spring integrally comprising:
      a base including the swing fulcrum portion and fixed to the upper rail;
      a rear biasing portion located behind the base in the vehicle front-rear direction and configured to bias the lock portion in the lock direction; and
      a front biasing portion located in front of the base in the vehicle front-rear direction and configured to bias the operation handle upward, the front biasing portion having a biasing force smaller than a biasing force of the rear biasing portion.

2. The seat slide device according to claim 1, wherein
the swing fulcrum portion comprises:
   a pair of protrusions protruding from left and right ends of the base; and
   a pair of recesses provided in upper ends of side walls of the release lever,
the pair of protrusions and the pair of recesses turnably engage with each other, and
the engagement between the pair of protrusions and the pair of recesses is maintained by the biasing force of the plate spring.

3. The seat slide device according to claim 1, further comprising a fastener configured to fix the base to a lower surface of the upper rail, wherein
the fastener comprises a protrusion protruding sideways on an opposite side to the upper rail across the lock member, and
the release lever comprises a lock protrusion located above the protrusion.

4. The seat slide device according to claim 1, wherein
the operation handle extends in the vehicle front-rear direction between an upper guide projection and a lower guide projection provided in the release lever,
the front biasing portion engages with a rear connecting portion of the operation handle at a position in front of the operation portion with relative movement between the front biasing portion and the rear connecting portion in the vehicle front-rear direction restricted, and
a gap is formed between the operation handle and the lower guide projection with the operation handle biased upward by the front biasing portion.

5. The seat slide device according to claim 4, wherein
a front end of the front biasing portion comprises a fitting projection projecting upward at a position in front of the operation portion,
the rear connecting portion comprises a fitting recess opened to a lower side, and
the operation handle is biased upward by the front biasing portion with the fitting projection fitted to the fitting recess from below.

6. The seat slide device according to claim 5, wherein
the operation handle comprises flanges protruding outward from lower ends of side surfaces forming the fitting recess toward left and right sides,
a gap between the upper guide projection and the lower guide projection in an up-down direction is larger in a front side of the release lever than in a rear side of the release lever,
the operation handle is supported to be swingable in the up-down direction relative to the release lever, and
the flanges
   extend between the upper guide projection and the lower guide projection,
   and
   are biased and supported by the front biasing portion to come into contact
with the upper guide projection from below.

7. The seat slide device according to claim 1, wherein
the operation handle comprises a rear connecting portion,
the release lever comprises a first projection provided in a lower portion of the release lever behind the operation portion and configured to come into upward contact with a lower portion of the rear connecting portion of the operation handle biased upward by the front biasing portion.

8. The seat slide device according to claim 7, wherein the release lever comprises:
   left and right side walls;
   a set of at least two second projections located below the operation portion and bent from lower ends of the left and right side walls toward each other, the second projections being configured to come into contact with the operation handle pushed downward;
   a wall portion provided above the second projections of the left and right side walls and arranged such that the rear connecting portion is arranged between the second projections and the wall portion, the wall portion being configured to come into contact with the operation handle pushed upward;
   a set of at least two third projections protruding from the left and right side walls toward each other and arranged such that the rear connecting portion is arranged between the first projection and the third projections; and
   a stopper facing a distal end of the rear connecting portion and configured to come into contact with the operation handle moved rearward relative to the release lever.

9. The seat slide device according to claim 8, wherein
the rear connecting portion comprises:
   a curved recess recessed in a shape in which a lower surface is curved upward; and
   a portion with a substantially M-shaped cross section provided behind the curved recess and having upper ends being flat surfaces,
the first projection is configured to come into upward contact with a lower portion of the portion with the substantially M-shaped cross section of the operation handle biased upward by the front biasing portion,
the third projections s are arranged between the first projection and the third projections, and
the stopper faces a distal end of the portion with the substantially M-shaped cross section.

10. The seat slide device according to claim 9, wherein the operation portion and the rear connecting portion at a position corresponding to the curved recess of the operation handle are provided with an engagement portion including an engagement projection and an engagement hole configured to engage with each other upon the operation handle being biased upward by the front biasing portion.

11. The seat slide device according to claim 9, wherein the third projections and the portion with the substantially M-shaped cross section are provided with a lock portion including a lock projection and a lock groove configured to be locked to each other upon a distal end of the rear connecting portion being moved upward by downward pushing of the operation handle.

12. The seat slide device according to claim 9, wherein the first projection and the stopper are provided integrally in the second projections.

13. The seat slide device according to claim 1, wherein
the lock member is attached to the upper rail to be swingable in the vehicle front-rear direction about the swing fulcrum portion,
the locked portion is lock grooves aligned in the vehicle front-rear direction in each of left and right portions of the lower rail,
the lock portion is lock teeth aligned in the vehicle front-rear direction in each of left and right portions of the lock member,
a first lock tooth and a first lock groove are engaged with each other with no gap in the vehicle front-rear direction, the first lock tooth being one of left and right lock teeth closest to the swing fulcrum portion among the lock teeth, the first lock groove being one of the lock grooves engaging with the first lock tooth, a gap in the vehicle front-rear direction between a second lock tooth and a second lock groove is smaller than each of gaps in the vehicle front-rear direction between third lock teeth and third lock grooves, the second lock tooth being the other one of the left and right lock teeth closest to the swing fulcrum portion, the second lock groove being one of the lock grooves engaging with the second lock tooth, the third lock teeth being the lock teeth other than the first lock tooth and the second lock tooth, the third lock grooves being lock grooves among the lock grooves engaging with the third lock teeth.

14. The seat slide device according to claim 13, wherein adjacent lock grooves of the lock grooves along the vehicle front-rear direction are arranged at a same interval in the vehicle front-rear direction, a first width of the first lock tooth in the vehicle front-rear direction is greater than a second width of the second lock tooth in the vehicle front-rear direction and a third width of the third lock teeth in the vehicle front-rear direction, and the second width is greater than the third width.

15. The seat slide device according to claim 13, wherein the lock teeth are formed integrally in the plate spring.

\* \* \* \* \*

UNITED STATES PATENT AND TRADEMARK OFFICE
CERTIFICATE OF CORRECTION

PATENT NO.       : 10,940,775 B2
APPLICATION NO.  : 16/287643
DATED            : March 9, 2021
INVENTOR(S)      : Kazuki Tamaki et al.

It is certified that error appears in the above-identified patent and that said Letters Patent is hereby corrected as shown below:

In the Claims

Claim 9, Column 30, Line 32, please delete the phrase "projections s are arranged" and replace with "projections are arranged".

Signed and Sealed this
Thirteenth Day of April, 2021

Drew Hirshfeld
*Performing the Functions and Duties of the*
*Under Secretary of Commerce for Intellectual Property and*
*Director of the United States Patent and Trademark Office*